United States Patent
Kato

(10) Patent No.: US 6,244,806 B1
(45) Date of Patent: *Jun. 12, 2001

(54) LOCKING WASHER AND LOCKING APPARATUS USING THE SAME

(75) Inventor: Tosiyuki Kato, Hidaka (JP)

(73) Assignee: T. Kato Co., Ltd., Saitama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/088,537

(22) Filed: Jun. 1, 1998

(30) Foreign Application Priority Data

Dec. 9, 1997 (JP) .................................................. 9-338910
Apr. 8, 1998 (JP) .................................................. 10-095735

(51) Int. Cl.⁷ .............................. F16B 19/00; F16B 39/36
(52) U.S. Cl. ..................... 411/265; 411/237; 411/270; 411/354; 411/935
(58) Field of Search ................................ 411/10, 11, 237, 411/267, 270, 354, 152, 153, 155, 156, 544, 935, 935.1, 265

(56) References Cited

U.S. PATENT DOCUMENTS

| 601,249 | 3/1898 | Geise | 411/270 |
|---|---|---|---|
| 1,005,227 | 10/1911 | Jones | 411/935 |
| 1,539,348 | 5/1925 | Botscheller | 411/270 |
| 2,449,846 | 9/1948 | Gilman | 411/237 |
| 4,684,284 | 8/1987 | Bradley, Jr. | 411/270 X |
| 5,015,133 | 5/1991 | Arena | 411/267 |
| 5,081,811 | 1/1992 | Sasaki . | |

FOREIGN PATENT DOCUMENTS

| 0352542 | 1/1990 | (EP) . |
| 1332745 | 12/1963 | (FR) . |
| 630748 | 10/1949 | (GB) . |
| 2201216 | 8/1988 | (GB) . |

*Primary Examiner*—Neill Wilson
(74) *Attorney, Agent, or Firm*—Frishauf, Holtz, Goodman, Langer & Chick, P.C.

(57) ABSTRACT

A locking apparatus includes an inner ring having a tapered outer shape and permitting a bolt of a fastener, with which construction elements are fastened, to pass therethrough, an outer plate formed with a tapered bore which receives the inner ring, a coil spring which urges the inner ring toward the outer plate, and a nut threadedly engaged with the bolt on the side close to an outer end of the coil spring. When an external force is applied to a construction so that the outer plate is displaced toward the nut, together with the construction element associated therewith, the outer plate applies a force, exerting in the direction axially of the bolt, to the inner ring. When receiving the force which has a component directed radially inwardly of the bolt, the inner ring is reduced in diameter to tighten the bolt, thereby preventing a further displacement of the outer plate and the construction element.

18 Claims, 12 Drawing Sheets

LOCKING WASHER AND LOCKING APPARATUS USING THE SAME

BACKGROUND OF THE INVENTION

1. Technical Field

The present invention relates to a locking washer for preventing construction elements fastened by a fastener from being loosened, and a locking apparatus using such a washer.

2. Related Art

A construction generally includes construction elements thereof fastened to one another by fasteners. For instance, a wooden building includes a pillar fixed to a beam by means of a fastener such as a strap bolt. In fastening a pillar to a beam with use of a strap bolt, a base plate of the strap bolt is fixed to the beam, and a bolt portion of the strap bolt is inserted through a through hole formed in the pillar. Then, a nut attached to the bolt portion of the strap bolt is tightened to thereby fix the pillar to the beam.

Although a wooden building is preferably constructed by use of fully dried wood, construction costs impractically increases in this case. On the other hand, in a wooden building constructed by use of insufficiently dried wood, such wood will be thinned with elapse of time. If, for instance, a pillar becomes thinned, the fastening of the pillar and the beam by a bolt/nut fastener is loosened. As a consequence, a problem is posed that the loosened pillar may vibrate when it receives external vibration caused by earthquake, vehicle traffic or the like.

The same is applied to other constructions, such as bridge, railroad rail, vehicular load-carrying platform, comprised of rigid construction elements fastened by fasteners. That is, if these constructions are frequently subject to vibration for a long time, the fastening of construction elements becomes loosened, so that the constructions are liable to vibrate.

SUMMARY OF THE INVENTION

An object of the present invention is to provide a locking washer for preventing the fastening of construction elements by a fastener from being loosened and a locking apparatus comprised of such a washer.

According to one aspect of the present invention, a locking washer is provided which comprises an outer plate and an inner ring. The outer plate has a first end face thereof disposed in contact with a first construction element of a construction and a second end face thereof disposed remote from the first construction element. The outer plate is formed with a bore extending therethrough. The inner ring is received in the bore of the outer plate. The inner ring has a first end face thereof disposed close to the first construction element and a second end face thereof disposed remote from the first construction element. The inner ring is formed with an axial bore which extends therethrough in a height direction of the inner ring. The axial bore permits a shaft member to extend therethrough. The shaft member extends from the first construction member toward the washer. The bore of the outer plate and an outer shape of the inner ring are formed such that a force directed radially inwardly of the inner ring is applied from the outer plate to the inner ring when the outer plate is displaced along the shaft member in the direction away from the first construction element. The inner ring is so configured that the diameter of the axial bore decreases up to an outer diameter of the shaft member when it receives the force acting radially inwardly of the inner ring under a condition that the inner ring is fitted in the bore.

When a strong external force is applied to a construction which includes the first construction element to which the locking washer of this invention is attached, the first construction element may be displaced toward the washer. At this time, the outer plate of the washer is pressed by the first construction element to be displaced along the shaft member. A force directing radially inwardly of the inner ring is applied from the outer plate to the inner ring. In response to the application of this force, the diameter of the inner ring decreases. Hence, the inner ring tightens the shaft member, so that the inner ring and the shaft member are fixed so as to be immovable from each other. As a result, a further displacement of the outer plate and the first construction element is prevented. That is, the first construction element is adequately prevented from being displaced. Moreover, the locking washer is simple in construction and is hence low-priced.

Typically, the locking washer of this invention is used together with a fastener for fastening a first and second construction elements of a construction. The locking washer may be arranged to be directly associated with the fastener, or may be arranged independently of the fastener. In either case, the locking washer prevents the displacement of the first construction element toward the washer which would otherwise be caused when an external force is applied to the construction, whereby the fastening of the first and second construction elements by means of the fastener can be prevented from being loosened. Thus, the first and second construction elements can be prevented from being vibrated when vibration input is applied to the construction.

Preferably, the outer plate is formed with a tapered bore, as the aforementioned bore, extending therethrough and having a diameter which decreases from the second end face of the outer plate toward the first end face of the outer plate. The inner ring is formed into a tapered outer shape which is complementary to the tapered bore of the outer plate.

With this preferred arrangement, when the first construction element is displaced toward the washer so that the outer plate is displaced along the shaft member in the direction away from the first construction element, a force exerting in the height direction of the inner ring is applied to the inner ring. Since the inner ring having a tapered outer shape is disposed in the tapered bore of the outer plate, a component of the force, directing radially inwardly of the inner ring is applied from the outer plate to the inner ring. In response to the application of this force component, the diameter of the inner ring decreases and hence the inner ring tightens the shaft member, so that a further displacement of the outer plate and the first construction element is prevented.

Preferably, a locking washer of this invention is used together with a fastener which includes a first fastening element having a shaft portion which constitutes the shaft member extending through the axial bore of the inner ring.

With this preferred arrangement, the locking washer is directly associated with the fastener, to thereby securely prevent occurrences of looseness in the fastening of a construction by the fastener.

More preferably, the first fastening element of the fastener is coupled to a second construction element of the construction, and the shaft portion of the first fastening element extends through the first construction element. The fastener includes a second fastening element which is coupled to the first fastening element on a side remote from the first construction element with respect to the washer in the height direction of the washer, and the second fastening element cooperates with the first fastening element to fasten the first construction element to the second construction element.

In the case of using the locking washer of the just-mentioned preferred embodiment, the shaft portion of the first fastening element is inserted into the bore of the outer plate, and the outer plate is disposed so that its first end face is brought in contact with the first construction element. Next, the inner ring is fitted into the bore of the outer plate, while the shaft portion of the first fastening element is inserted into the axial bore of the inner ring. Further, the second fastening element of the fastener is coupled to the first fastening element. The inner ring is kept fitted in the outer plate by means of, e.g., the second fastening element.

After the washer is attached to the shaft portion of the first fastening element, if the outer plate is pressed by the first construction element which is displaced by the application of an external force to the construction so that the outer plate is displaced along the shaft portion of the first fastening element, then the inner ring decreases in diameter to tighten the shaft portion of the first fastening element. As a result, the outer plate and the first construction element are prevented from being further displaced relative to the shaft portion of the first fastening element toward the second fastening element. As a consequence, the fastening of the first and second construction elements by the fastener is prevented from being loosened.

In the present invention, preferably, the inner ring is formed with a slit which extends therethrough in the height direction of the inner ring.

With this preferred arrangement, when the inner ring receives a force exerting radially inwardly of the inner ring, the inner ring may easily decrease in diameter up to an amount corresponding to a gap interval provided by the slit, thereby securely tightening the shaft portion of the shaft member, to positively prevent the displacement of the outer plate and the first construction element. Moreover, the inner ring which is configured into a single piece member is easy to handle.

Preferably, the inner ring is formed at an axial-bore-formed face with an engagement pawl.

With this preferred arrangement, when the inner ring decreases in diameter in response to the application of a force exerting radially inwardly of the inner ring, the engagement pawl bites into the outer peripheral face of the shaft member, thereby positively preventing a relative movement between the inner ring and the shaft member, so that a looseness in the fastening can be positively prevented.

More preferably, the inner ring is formed at an axial-bore-formed face with a multi-row engagement pawl which is comprised of plural engagement pawls ranged in the height direction of the inner ring. Each of the plural engagement pawls extends circumferentially along the entirety of the axial-bore-formed face of the inner ring and has a tip thereof diagonally directed to the second end face of the inner ring as viewed in the vertical cross section of the inner ring.

With this preferred arrangement, the multi-row engagement pawl has, as a whole, a sawtooth shape in cross section as viewed in the height direction of the inner ring. The multi-row engagement pawl does not hinder the locking washer from being attached to the shaft member. When the inner ring decreases in diameter, the multi-row engagement pawl bites into the entirety of the outer peripheral face of the shaft member in a broad vertical region of the shaft member. As a result, occurrences of looseness in the fastening can be positively prevented.

Preferably, the outer plate is formed, at a vertical side thereof close to its second end face, with an engagement portion which projects from the bore-formed face of the outer plate radially inwardly of the bore. Further, the engagement portion is disposed for contact with the second end face of the inner ring disposed in the bore of the outer plate.

With this preferred arrangement, on an occasion that the inner ring is mounted to the outer plate, the inner ring is reduced in diameter by applying an external force to the inner ring with use of an appropriate tool, for instance, to an extent that the inner ring does not interfere with the engagement portion of the outer plate, so that the inner ring may be received in the bore of the outer plate. Thereafter, a normal diameter of the inner ring is restored when such an external force is removed. Hence, the inner ring is accommodated in the bore of the outer plate so as not to be detached therefrom. As a result, the inner ring and the outer ring are brought into one piece, and become easy to handle.

More preferably, the inner ring is formed at a side thereof close to its second end face with an annular flange which is located at a position radially inwardly of the washer with respect to the engagement portion of the outer plate. The flange extends in a direction away from the first end face of the inner ring beyond the second end face of the outer plate as viewed in a height direction of the washer, and has an end face thereof located at a side remote from the outer plate and constituting the second end face of the inner ring.

With this preferred arrangement, even if the engagement portion is provided in the outer plate, it is possible to support the inner ring in the axial direction, e.g., by use of a fastening element which is coupled to the shaft portion of the shaft member and which is in contact with the flange of the inner ring. This makes it easy to use the washer.

Preferably, the locking washer further includes an urging member comprised of a resilient material for urging the inner ring toward the outer plate. The urging member is accommodated in a recess formed in the outer plate. The recess opens to the second end face of the outer plate and communicates with the bore. When disposed in the recess, the urging member is in urged contact with the second end face of the inner ring.

With this preferred arrangement, the inner ring is always kept to be in urged contact with the bore-formed face of the outer plate, whereby the looseness preventing function of the locking washer is ensured.

More preferably, the urging member is disposed in the recess so as not to be detached therefrom.

With this preferred arrangement, the inner ring and the urging member are accommodated in the outer plate, whereby the locking washer can be handled and assembled with ease.

Alternatively, the locking washer further includes a spring member for pressing the urging member accommodated in the recess of the outer plate toward the first end face of the outer plate. The spring member is held by engagement pawls formed integrally with the outer plate and projecting from the second end face of the outer plate in the direction away from the first end face of the outer plate.

With this preferred arrangement, the inner ring is always kept to be in urged contact with the bore-formed face of the outer plate, whereby the looseness preventing function of the washer is ensured, and the component parts of the washer are formed into one piece so that the washer can be handled with ease.

Preferably, the outer plate of the locking washer is formed with an engagement element which perpendicularly projects from the first end face of the outer plate in the direction away from the second end face of the outer plate and which is adapted to be engaged with the first construction element. When the engagement element is engaged with the first construction element, the outer plate is fixed to the first construction element.

With this preferred arrangement, the outer plate is fixed to the first construction element so as to be movable in unison therewith, whereby an adequate looseness preventing effect of the washer can be attained even if the first construction element is of a type liable to be thinned with elapse of time. Thus, this preferred washer is suitable especially for use with a wooden building such as a log cabin.

Alternatively, the outer plate of the locking washer is formed at its portion, located radially outwardly of the bore, with an insertion hole which extends through the outer plate in the height direction of the outer plate. The insertion hole permits an engagement element, which is adapted to be engaged with the first construction element, to pass therethrough. When the engagement element is engaged with the first construction element, the outer plate is fixed to the first construction element.

With this preferred arrangement, the outer plate can be fixed to the first construction element, thereby achieving an adequate looseness preventing effect.

According to another aspect of the present invention, a locking apparatus is provided, which comprises the aforementioned locking washer having the inner ring and the outer plate, and pressing means for causing the inner ring to be in urged contact with the outer plate.

The locking apparatus of this invention adequately holds the inner ring in the bore of the outer plate by means of the pressing means, and, as in the case of the foregoing locking washer, positively achieves the functions of preventing occurrences of looseness in the fastening and vibration of the construction element concerned.

Preferably, the pressing means is comprised of a fastening element which is coupled, at a side remote from the first construction element as viewed in a height direction of the locking apparatus, to the shaft member.

With this preferred arrangement, it is possible to easily configure the pressing means.

More preferably, the locking apparatus is used together with a fastener which includes a first fastening element having a shaft portion which constitutes the shaft member. Further, the pressing means is comprised of a fastening element which is coupled, at a side remote from the first construction element as viewed in a height direction of the locking apparatus, to the shaft portion of the first fastening element. For instance, the first fastening element of the fastener is comprised of a bolt, and the fastening element which constitutes the pressing means is comprised of a nut threadedly engaged with the bolt.

With this preferred arrangement, the fastening element which serves as the pressing means, on one hand, cooperates with the locking washer to constitute the locking apparatus, and on the other hand, cooperates with the first fastening element to constitute the fastener. That is, the locking apparatus is directly associated with the fastener, thereby positively preventing the fastening by the fastener from being loosened.

More preferably, the pressing means includes a fastening element which is coupled, at a side remote from the first construction element as viewed in a height direction of the locking apparatus, to the shaft member, and a resilient member which is disposed between the fastening element and the inner ring and which always urges the inner ring toward the outer plate.

With this preferred arrangement, in case that the first construction element is comprised of insufficiently dried wood, even if the wood becomes dried and thinned, no substantial gap is produced between the outer plate and the first construction element since the outer plate is always urged by the resilient member of the pressing means, through the inner ring, toward the first construction element.

More preferably, the pressing means includes a fastening element which is coupled, at a side remote from the first construction element as viewed in a height direction of the locking apparatus, to the shaft member, a coil spring which always urges the inner ring toward the outer plate, and a spring seat which includes a main body thereof disposed between the second end face of the inner ring and the coil spring. Further, the spring seat includes a first extension which extends from the main body toward the outer plate and which is engaged with the outer plate, and a second extension which extends from the main body toward the fastening element of the pressing means and which holds the coil spring.

With this preferred arrangement, the outer plate, the inner ring and the coil spring are unified into one piece by means of the spring seat, whereby the locking apparatus becomes easy to handle.

Preferably, the locking apparatus further includes an engagement element adapted to be engaged with the first construction element. When the engagement element is engaged with the first construction element, the outer plate is fixed to the first construction element.

The engagement element is formed independently of the outer plate of the locking apparatus. The outer plate is formed at its portion, located radially outwardly of the bore, with an insertion hole which extends through the outer plate in the height direction of the outer plate. The insertion hole permits the engagement element, which is adapted to be engaged with the first construction element, to pass therethrough.

Alternatively, the engagement element is formed integrally with the outer plate of the locking apparatus. The engagement element perpendicularly projects from the first end face of the outer plate in the direction away from the second end face of the outer plate.

With these preferred arrangements, the outer plate is fixed to the first construction element so as to be movable in unison therewith, whereby an adequate looseness preventing effect of the washer can be attained even if the first construction element is of a type liable to be thinned with elapse of time. These arrangements are suitable especially for use with a wooden building such as a log cabin.

DETAILED DESCRIPTION

With reference to the accompanied drawings, preferred embodiments of a locking washer and a locking apparatus of the present invention will be explained.

Figure 1:
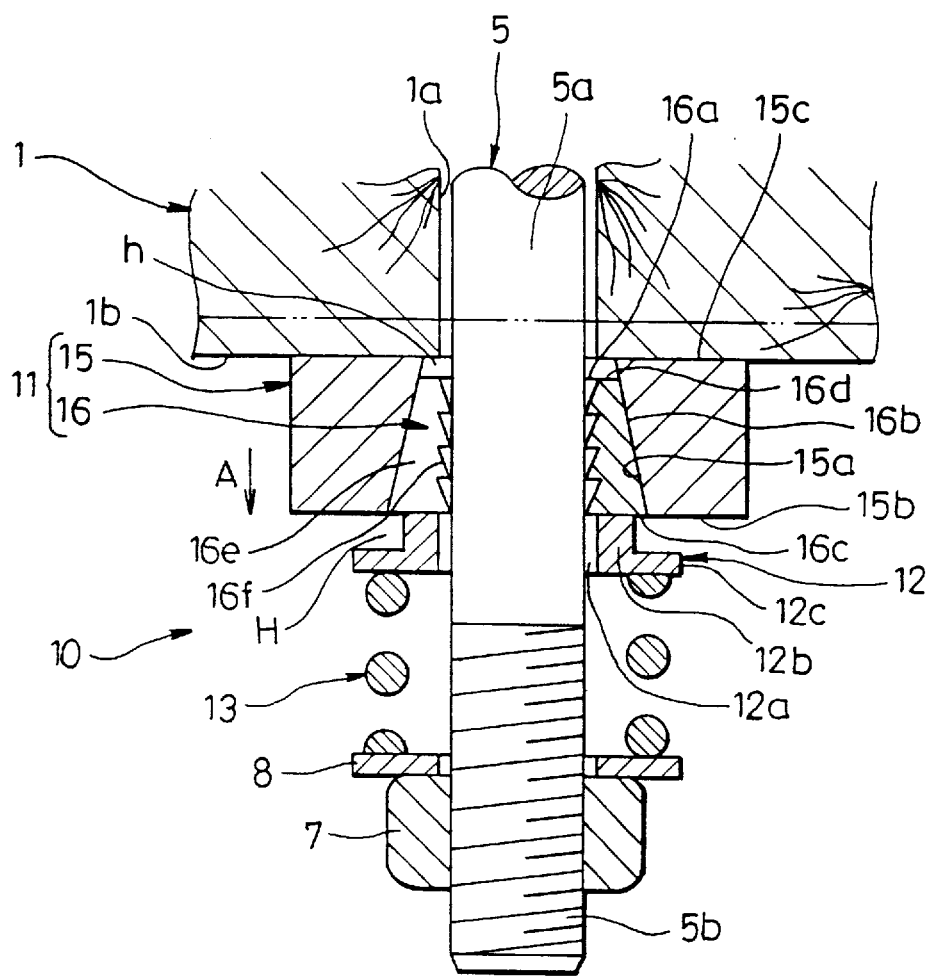
FIG. 1 is a sectional view of a locking apparatus according to a first embodiment of the present invention.
Figure 22:
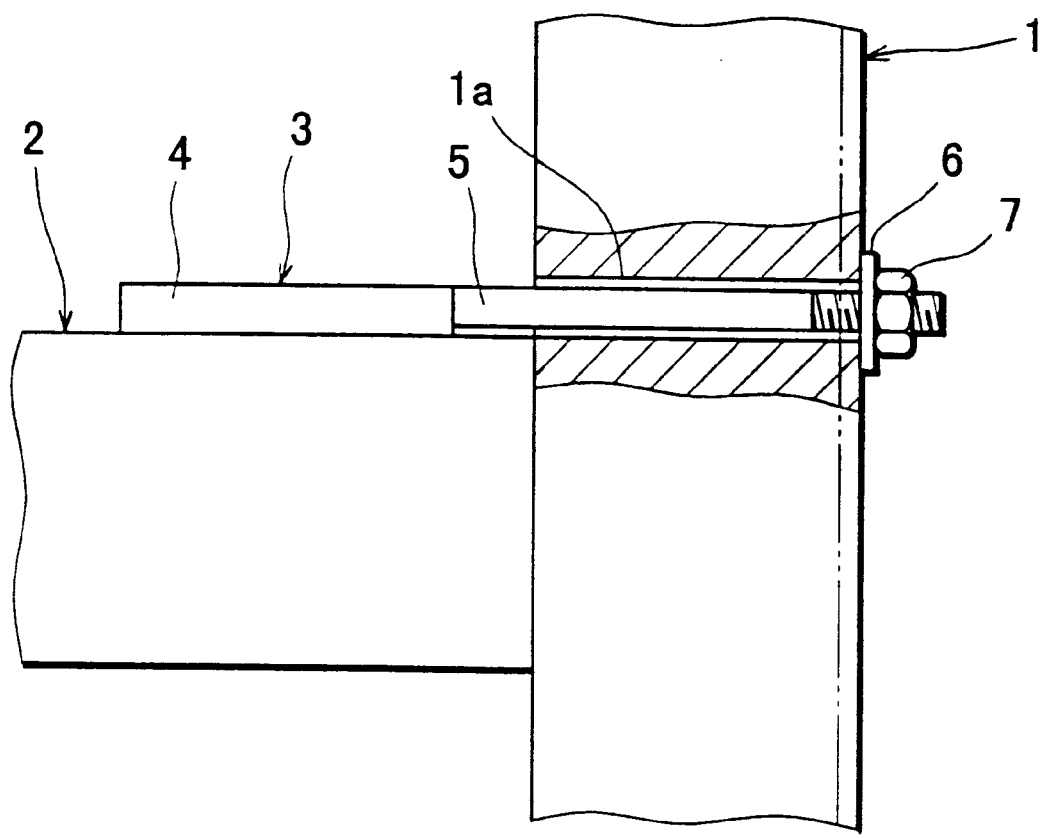
FIG. 22 is a sectional view showing, by way of example, a known fastener in which wooden construction elements are fastened by means of a strap bolt.

Referring to FIG. 1, a locking apparatus 10 according to a first embodiment of the present invention is attached to, e.g., a fastener shown in FIG. 22, and prevents the fastening of construction elements of a wooden building by means of the fastener from being loosened. In FIG. 22, reference numerals 1 and 2 denote a pillar and a beam of the wooden building, respectively, and reference numeral 3 denotes a strap bolt. Further, reference numerals 4, 5, 6 and 7 denote a base plate, bolt portion, washer and nut of the strap bolt 3, respectively, and reference numeral 1a denotes a hole formed in the pillar 1 and permitting the bolt 5 to pass therethrough.

In this manner, the locking apparatus 10 of the present embodiment cooperates with the bolt portion 5 of the strap bolt (more generally, a first fastening element of a fastener) to fasten a pillar and a beam of a wooden building (more generally, two construction elements of a construction) and to prevent the fastening from being loosened. However, it is not inevitably necessary to arrange the locking apparatus 10 so as to be directly associated with a fastener such as a strap bolt. Alternatively, the locking apparatus may be arranged independently from a fastener. In this case, in stead of the bolt portion 5, a shaft member (not shown) which is basically the same in construction as the bolt portion 5 is provided in the pillar 1.

Referring to FIG. 1, the locking apparatus 10 is provided with a locking washer 11 which is mounted to a bolt 5 with use of a nut 7. On one hand, the nut 7 cooperates with the washer 11 to constitute the locking apparatus 10, and on the other hand, cooperates with the bolt 5 to constitute the fastener. The washer 11 is comprised of an outer plate 15 and an inner ring 16 each of which is made of metal such as iron.

The outer plate 15 is formed at its central part with a tapered bore 15a, and is, as a whole, formed into an annular ring having a circular or rectangular shape in cross section. The diameter of the tapered bore 15a decreases from the lower end face 15b to the upper end face 15c of the outer plate 15.

Figure 2:
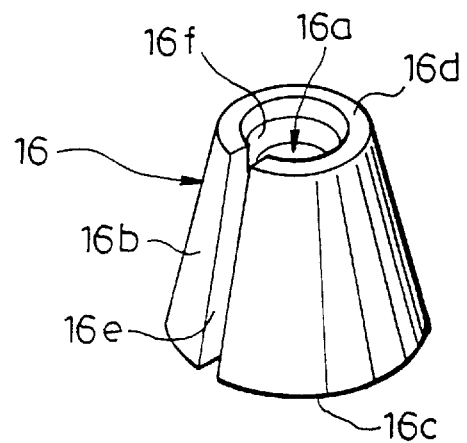
FIG. 2 is a perspective view of an inner ring of a locking washer shown in FIG. 1.

As shown in FIGS. 1 and 2, the inner ring 16 which has a tapered outer peripheral face 16b is, as a whole, formed into a tapered outer shape which is complementary to the tapered bore 15a of the outer plate 15. The inner ring 16 has its peripheral wall formed with a slit 16e which extends therethrough from the lower end face 16c to the upper end face 16d of the inner ring 16. That is, the inner ring 16 is formed into a C-ring of a truncated cone shape and is fitted into the tapered bore 15a. Further, the inner ring 16 is adapted to decrease in diameter up to an amount corresponding to a gap interval provided by the slit 16e when it receives an external force exerting in the height direction of the inner ring so that a component force exerting in the radially inward direction of the inner ring is applied thereto.

The inner ring 16 formed with a bolt hole 16a is formed at its bolt-hole-formed face with a multi-row engagement pawl comprised of plural annular engagement pawls 16f which are ranged vertically of the inner ring and which are formed independently of one another. Each of the engagement pawls 16f is provided with a blade tip directed diagonally downwardly from the bolt-hole-formed face. The multi-row engagement pawl is, as a whole, formed into a sawtooth shape in cross section. The bolt hole 16a has, at the tips of the engagement pawls 16f, a diameter which is substantially the same as the outer diameter of the bolt 5.

In mounting the washer 11 onto the bolt 5, the engagement pawls 16f do not bite into the surface of the bolt 5 when the inner ring 16 is moved from the distal end of the bolt 5 toward the pillar 1. Thus, the mounting of the inner ring 16 onto the bolt 5 can be made smoothly.

On the other hand, when receiving an external force acting downward in FIG. 1, the inner ring 16 is about to move downward while being slightly decreased in diameter. On this occasion, each of the engagement pawls 16f rapidly bites into the surface of the shaft portion 5a or threaded portion 5b of the bolt 5. Meanwhile, it is advisable to use engagement pawls 16f having a fine pitch which permits these pawls to adequately bite into the bolt 5 to thereby produce an increased engagement force.

In stead of using the multi-row engagement pawl comprised of plural annular engagement pawls 16f which are independent from one another, the multi-row engagement pawl may be formed into a spiral form. In this case, preferably, the spiral pawl has a spiral which is opposite in direction, e.g., left-hand thread, to that of the thread portion 5b of the bolt 5, which has, e.g., a right-hand thread. By arranging the engagement pawl in the above manner, the spiral engagement pawl 16f crosses the thread ridges of the threaded portion 5b to produce an adequate engagement force when the inner ring 15 and the bolt 5 are disposed such that the spiral engagement pawl 16f of the inner ring 16 face the threaded portion 5b of the bolt 5. By forming the engagement pawl into a spiral form, manufacturing costs can be reduced.

The outer plate and the inner ring are formed to have their heights (plate thickness) in the order of 5 mm, for instance. The height of the inner ring 16 is smaller than that of the outer plate 15 by an amount h (e.g., about 1 mm). The height difference h may be set to an appropriate dimension according to the hardness of a construction element to which the washer is mounted. The height difference may be about 1 mm in the case of a soft member such as wooden construction element, and may be about 0.1 mm to 0.5 mm for a hard member such as metal member. Further, the inner ring 16 is preferably formed to have a small thickness to make it easy for the inner ring to be decreased in diameter.

Preferably, the tapered bore 15a of the outer plate 15 has a smaller taper angle so as to make the wall thickness of the inner ring 16 thinned so long as the outer plate can apply a sufficient force, which in turn generates an adequate radial component force, to the inner ring when it is displaced. The taper angle of the engagement pawls of the inner ring may be set at an appropriate angle by taking the biting ability into consideration.

The locking apparatus includes a spring seat 12 made of metal such as iron. The spring seat is formed at its central part with an axial bore 12a having a diameter slightly larger than the outer diameter of the bolt 5, and is hence formed into a ring shape, as a whole. Further, the spring seat 12 is provided with an upper portion 12b and a flange portion 12c formed integrally therewith. The upper portion 12b of the spring seat 12 has its outer diameter which is slightly smaller than the outer diameter of the lower end face 16c of the inner ring 16, and has its height H which is slightly greater than the thickness difference h between the outer plate 15 and the inner ring 16.

Further, the apparatus includes a coil spring 13, which serves to press the inner ring 16 toward the outer plate 15, thereby causing the inner ring to be fitted in the outer plate. The coil spring 13 is disposed around the bolt 15 between the flange portion 12c of the spring seat 12 and a spring seat 8 for the nut 7. When the nut 7 threadedly attached to the bolt 5 is fastened, the coil spring 13 is compressed and generates a spring force to press the inner ring 16.

In the following, explanations will be given as to how the locking apparatus 10 shown in FIGS. 1 and 2 is mounted to the bolt 5 and how the locking apparatus operates.

In case that the locking apparatus 10 is used together with a strap bolt to fix a pillar and an associated beam of a wooden building, a base plate (corresponding to element 4 shown in FIG. 22) of the strap bolt is fixed in advance to the beam (corresponding to element 2 shown in FIG. 22). Next, the outer plate 15 is so disposed that the tapered bore 15a formed therein is in alignment with a bolt (i.e., a bolt portion of the strap bolt) 5 which extends through a hole 1a formed in the pillar 1, and then the outer plate 15 is caused to move along the bolt 5 until an upper end face 15c of the outer plate 15 is brought in contact with a side face 1b of the pillar 1. Further, the inner ring 16 is moved along the bolt 5 toward the outer plate 15, with the bolt 5 inserted into a bolt hole 16a of the inner ring, thereby causing the inner ring 16 to be fitted into the tapered bore 15a of the outer plate 15. At this time, the outer peripheral face of the bolt 5 is lightly in contact with or out of contact with the engagement pawls 16f formed in the bolt-hole-formed face of the inner ring 16. After the spring seat 12, the spring 13 and the spring seat 8 are mounted to the bolt 5 in this order, the nut 7 is threadedly engaged with the bolt and is strongly tightened to thereby fasten the pillar 1 and the associated beam to each other.

As the nut 7 is tightened, the coil spring 13 is compressed and presses the inner ring 16 through the spring seat 12. Thus, the inner ring 16 presses the outer plate 16, to thereby cause the upper end face 15c of the outer plate 15 to be in urged contact with the side end 1b of the pillar 1. Under this condition, the upper end face 16d of the inner ring 16 faces the side face 1b of the pillar 1 with a slight gap equivalent to the thickness difference h between the outer plate 15 and the inner ring 16. Moreover, a gap substantially corresponding to the height H of the upper portion 12a of the spring seat 12 is defined between the flange 12c of the spring seat 12 and the lower end face 15c of the outer plate 15. In the meantime, a cotter pin (not shown) may be provided in the bolt 5 to positively prevent the nut 7 from being loosened.

If the pillar 1 becomes thinned with elapse of time so that the side face 1b of the pillar retreats as shown in the two-dotted chain line in FIG. 1, the inner ring 16 is pressed toward the pillar 1 by means of a spring force generated by the coil spring 13. At this time, the multi-row engagement pawl 16f which is a sawtooth shape in cross section and which has blade tips directed diagonally downwardly does not hinder the movement of the inner ring 16 toward the pillar 1. As a result, the inner ring 16 smoothly moves toward the pillar 1 to securely cause the outer plate 15 to be brought in urged contact with the side face 1b of the pillar 1. In this manner, even if the pillar 1 becomes thinned, the locking apparatus 10 prevents occurrences of looseness in the fastening of the pillar 1 and the beam by means of the strap bolt. As a consequence, the pillar 1 and the beam are kept fastened adequately, so that no substantial vibration of the pillar 1 occurs due to a looseness in the fastening.

Assuming that the pillar 1 is shaken by an external vibration caused by, e.g., earthquake, in the direction shown by arrow A in FIG. 1, the outer plate 15 is pressed by the pillar 1 in the direction of the arrow A. On the other hand, the inner ring 16, having its upper end face 16d disposed apart from the side face 1b of the pillar 1 by a gap h, receives no pressing force from the pillar 1. Moreover, the inner ring 16 is always urged by the spring force of the coil spring 13 toward the outer plate 15. As a consequence, when pressed in the direction of the arrow A, the outer plate 15 applies the tapered outer peripheral face 26b of the inner ring 16, disposed in the tapered bore 15a, with a force acting in the direction of the arrow A, i.e., in the vertical direction of the inner ring. Thus, the inner ring 16 formed with the slit 16e so as to be easily decreased in diameter is applied with a component of this force, exerting radially inwardly of the inner ring. When receiving this force component, the inner ring 16 decreases in diameter, and the engagement pawls 16f bite into the surface of the shaft portion 5a of the bolt 5, thereby preventing the inner ring 16 from moving along the bolt 5 in the direction of the arrow A, whereby a further movement of the outer plate 15 in the direction of the arrow A is prevented. This prevents a further movement of the pillar 1 in the direction of arrow A, thereby the pillar 1 and the beam are kept fastened appropriately. The coil spring 13 serving to press the inner ring 16 to the outer plate 15 is not required to produce a strong spring force. Thus, the coil spring 13 is low-priced.

Meanwhile, if the inner ring 16 is disposed at a vertical location at which it faces the thread portion 5b of the bolt 5, the engagement pawls 16f of the inner ring 16 bite into the surface of the thread portion 5b. Moreover, since these engagement pawls 16f are formed into an annular shape or a spiral form, the engagement pawls never fall between the thread ridges of the thread portion 5b of the bolt 5, so that they effectively bite into the surfaces of the thread ridges of the thread portion 5b. However, it is advisable to cause the engagement pawls to bite into the shaft portion 5a of the bolt. More preferably, the bolt 5 has its shaft portion having substantially the same diameter as that of the thread portion 5*b*. In such a bolt, no substantial gap is produced between the engagement pawls 16*f* and the shaft portion 5*a* when the inner ring 16 is mounted to the shaft portion 5*a* of the bolt 5. This makes it possible for the engagement pawls 16*f* to immediately and strongly bite into the surface of the shaft portion.

In the foregoing embodiment, the spring seat 12 is provided between the spring 13 and the lower end face 16*c* of the inner ring 16. However, if the outer diameter of the spring 13 is smaller than the outer diameter of the lower end face 16*c* of the inner ring 16, it is not inevitably necessary to provide the spring seat 12.

In the following, with reference to FIG. 3, a locking apparatus according to a second embodiment of the present invention will be explained.

The apparatus of this embodiment is featured in that a spring seat comprised of a flat plate is employed to thereby reduce manufacturing costs.

Figure 3:
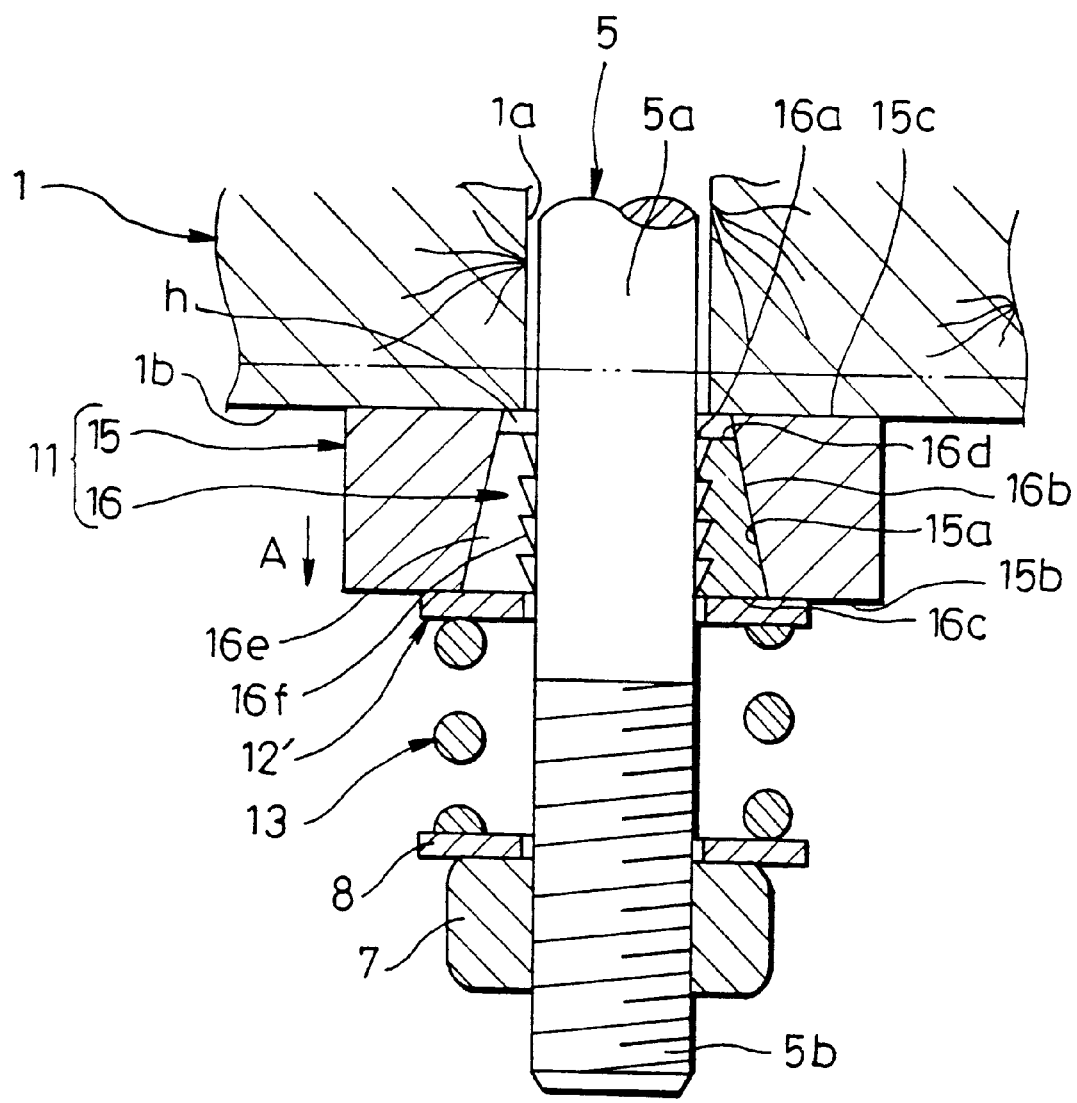
FIG. 3 is a sectional view showing a locking apparatus according to a second embodiment of the present invention.

In FIG. 3, like numerals are affixed to like elements which are similar to elements shown in FIG. 1, and explanations for these elements will be omitted hereinbelow.

As shown in FIG. 3, a spring seat 12' of the locking apparatus of this embodiment, which is comprised of a flat plate, has its outer diameter which is larger than the diameter of the tapered bore 15*a*, measured at the lower end face 15*b*, of the outer plate 15. When receiving a spring force produced by a coil spring 13, the spring seat 12' is brought in urged contact with the lower end face 16*c* of the inner ring 16 and the lower end face 16*b* of the outer plate 15, thereby causing the inner ring 16 to be pressed against the outer plate 15 which is in turn pressed against the side face 1*b* of the pillar 1.

When an external face is applied to a wooden building to which the locking apparatus constructed as mentioned above is mounted, so that the pillar 1 and the outer plate 15 are pressed in the direction shown by arrow A in FIG. 3, the inner ring 16 is caused to instantly decrease in diameter in response to the movement of the outer plate 15 and bites into the bolt 5, as in the case of the apparatus of the first embodiment, whereby a further movement of the pillar 1 an the outer plate 15 is prevented.

In the just-mentioned embodiment, the outer diameter and wire diameter of the coil spring 13 may be selected in such a manner that the upper end face of the coil spring 13 is brought in urged contact with both the lower end face 15*b* of the outer plate 15 and the lower end face 16*c* of the inner ring 16. In this case, the spring seat 12' may be omitted, to thereby make it possible to further reduce manufacturing costs.

Figure 4:
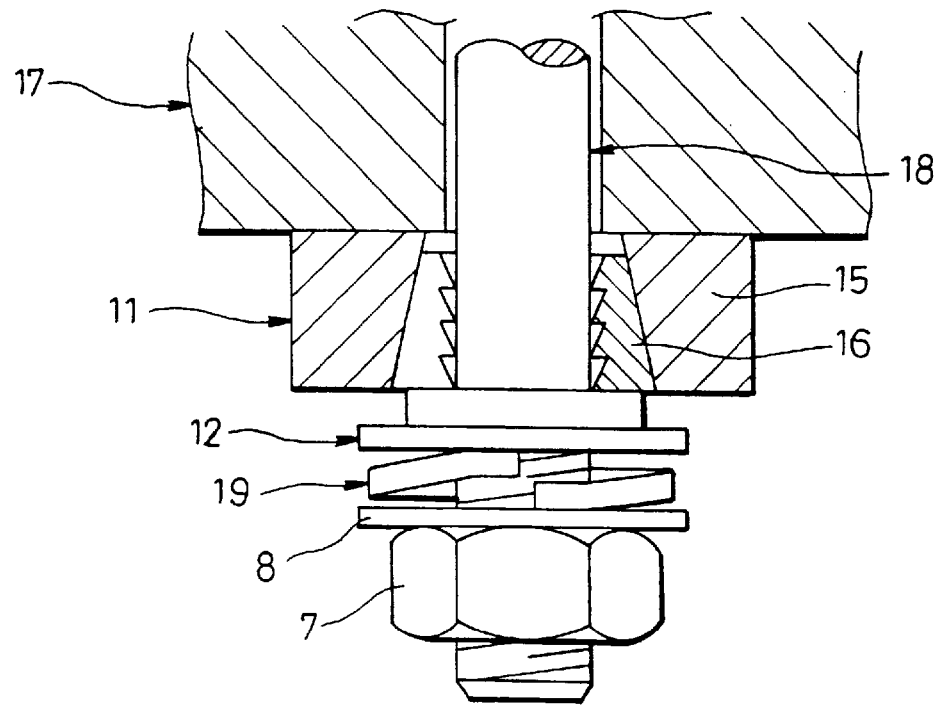
FIG. 4 is a sectional view showing a locking apparatus according to a third embodiment of the present invention.

With reference to FIG. 4, a locking apparatus according to a third embodiment will be explained.

The apparatus of this embodiment, which is suitably employed to fasten construction elements such as iron members which do not hardly change in dimension with elapse of time, is featured in that a further reduction in costs is achieved by using a spring washer 19 in stead of the coil spring 13 shown in FIG. 1. The spring washer 19 is low-priced, although it provides a possible maximum displacement which is less than that of the coil spring 13.

In FIG. 4, reference numeral 17 denotes a construction element which is made of iron, and 18 denotes a bolt for fastening the construction element 17 to another construction element (not shown).

In the apparatus of this embodiment, the spring seat 12' made of a flat plate and shown in FIG. 3 may be employed in stead of the spring seat 12.

In the following, a locking washer according to a fourth embodiment of the present invention will be explained with reference to FIG. 5.

A locking washer of this embodiment is featured in that it is easy to assemble and has an improved operability.

Figure 5:
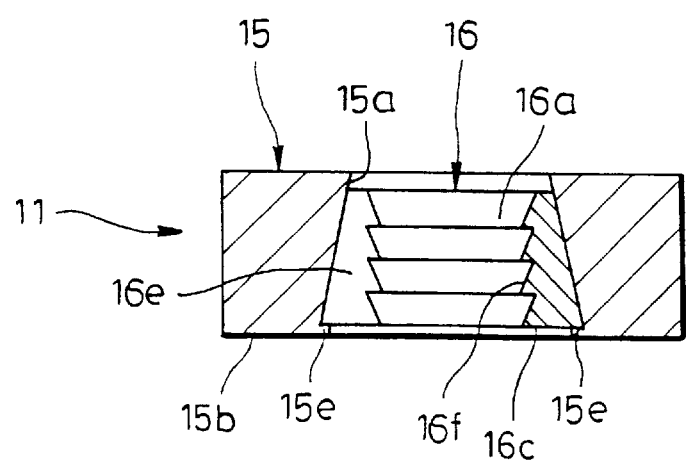
FIG. 5 is a sectional view of a locking washer according to a fourth embodiment of the present invention.

As shown in FIG. 5, the outer plate 15 of the washer 11 is formed at its tapered-bore-formed face, on a side close to the lower end face 15*b*, with an annular engagement portion 15*e* which extends over the entire circumference of the tapered-bore-formed face. The engagement portion 15*e*, having an upper end thereof arranged to be brought in contact with the lower end face 16*c* of the inner ring 16, serves to hold the inner ring 16 within the tapered bore 15*a* so as not to be detached therefrom.

The washer of this embodiment, which is capable of holding the inner ring 16 within the tapered bore 15*a* and prevents the ring from being detached therefrom, does not require the provision of a nut, spring seat and coil spring in case that the washer is arranged independently of a fastener, i.e., if the shaft member extending through the axial bore 16*a* of the inner ring 16 is comprised of an element which is separate from a fastening bolt of the fastener. The shaft member (not shown), which is separate from the fastening bolt, is arranged in a pillar 1 (construction element) so as not to be detached therefrom and is configured to extend from the pillar toward the washer. On the other hand, in case that the washer is arranged so as to be directly associated with the fastener, it is preferable to use the nut, spring seat and coil spring shown in FIG. 1 or 3, for instance.

In arranging the inner ring 16 within the tapered bore 15*a*, an external force exerting in the direction radially inwardly of the inner ring 16 is applied thereto by use of an appropriate tool (not shown), for instance, to thereby cause the inner ring 16 to reduce in diameter so as not to interfere with the engagement portion 15*e*, whereby the inner ring 16 is received in the tapered bore 15*a* of the outer plate 15. If the external force is removed thereafter, the inner ring 16 is restored to have a normal diameter and is retained in the tapered bore 15*a* in a manner prevented from being detached therefrom. As a consequence, the inner 16 and the outer plate 15 are rendered in one piece and become easy to handle.

In stead of using the annular engagement portion 15*e*, plural engagement portions (not shown) each having, e.g., an arcuate shape in transverse section, may be provided in the tapered-bore-formed face of the outer plate 15 at spacial intervals in the direction circumferentially of the tapered bore 15*a*. However, an arrangement having the annular engagement portion 15 is low in costs as compared to the arrangement formed with the plural engagement portions.

Figure 6:
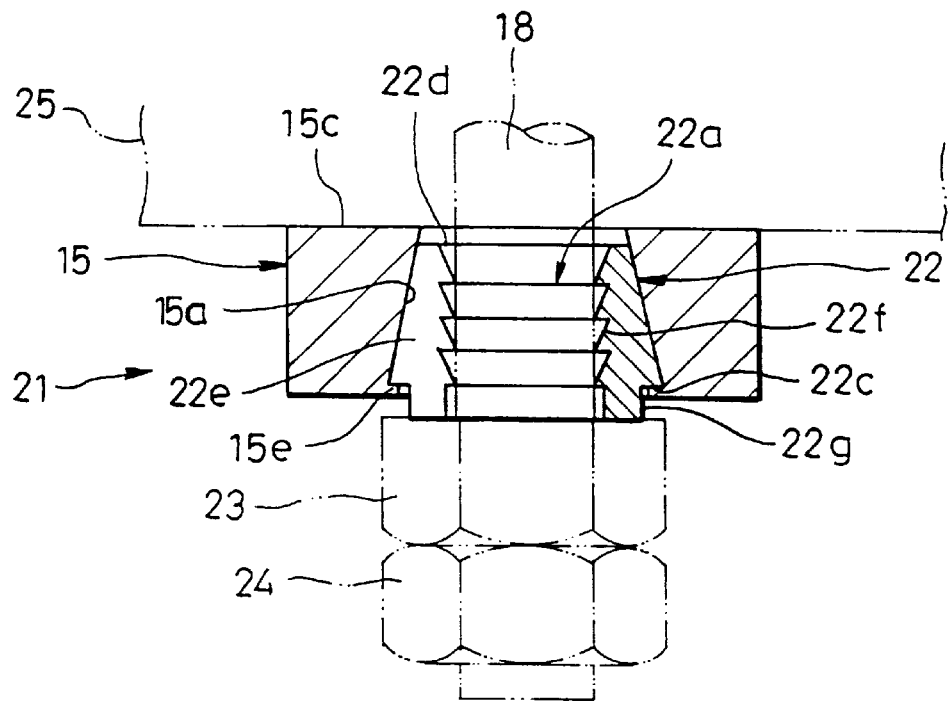
FIG. 6 is a sectional view of a locking washer according to a fifth embodiment of the present invention.
Figure 7:
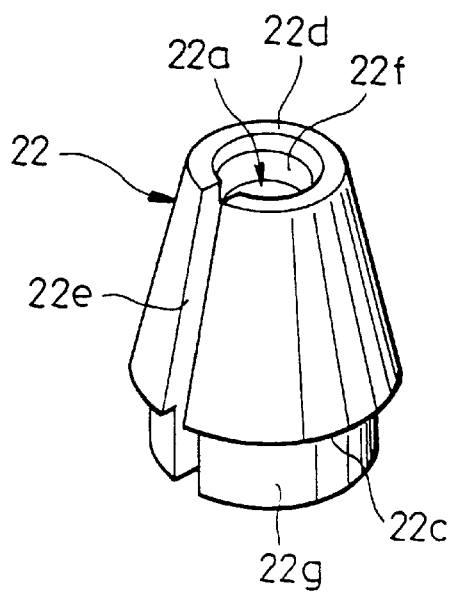
FIG. 7 is a perspective view of an inner ring shown in FIG. 6.
Figure 8:
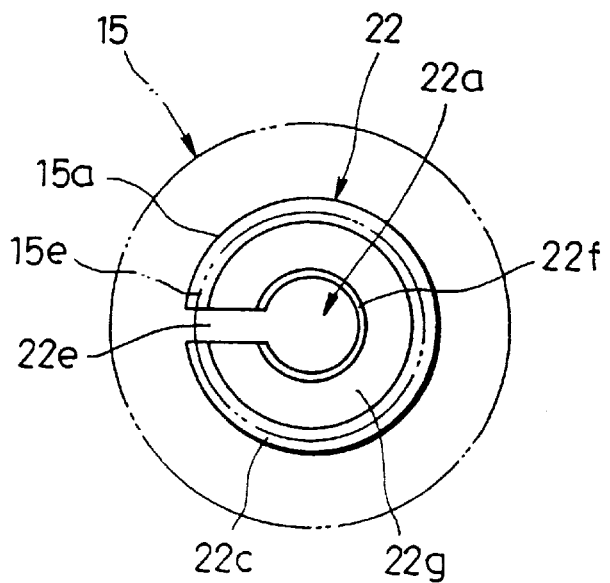
FIG. 8 is a bottom view of the inner illustrated in FIG. 7.

With reference to FIGS. 6 to 8, a locking washer according to a fifth embodiment of the present invention will be explained.

The washer of this embodiment is featured in that it does not require the provision of a coil spring, spring seat, etc., even if the washer is so arranged as to directly associated with a fastener, thereby making it possible to reduce the number of component parts.

As shown in FIGS. 6 to 8, the locking washer 21 of this embodiment is basically the same in construction as the washer 11 shown in FIG. 5. In FIGS. 6 to 8, like numerals are affixed to those elements which are the same as or similar to corresponding elements shown in FIG. 5, and explanations for these elements will be omitted. On the other hand, the washer 21 differs in that it has the inner ring 16 having a lower end face 22c thereof formed with a flange 22g coaxially with the inner ring, as distinct from the washer 11 of FIG. 5.

More specifically, the flange 22g has an outer diameter which is slightly smaller than the inner diameter of the annular engagement portion 15e of the outer plate 15, has its inner diameter which is slightly greater than the inner diameter of the blade tip of the engagement pawl 22f formed in the inner ring 22, and has its height which is slightly larger than the distance between the upper end face 22d of the inner ring 22 and the upper end face 15c of the outer plate 15. The flange 22g projects from the engagement portion 15e of the outer plate 15 in the direction vertically downwardly of the washer, when most parts of the inner ring 22 are accommodated within the tapered hole 15a of the outer plate 15. The washer 21 is fastened to a bolt 18, which constitutes the shaft member, with use of nuts 23 and 24. These nuts 23, 24 directly presses the flange 22g of the inner ring 22, thereby pressing the inner ring 22 against the outer plate 15, and further presses the outer plate 15 against a construction element 25. This washer arrangement, adapted to directly press the inner ring 22 against the outer plate 15 by means of the double nut 23, 24, does not require the provision of a spring seat 12 or 12' (FIG. 1 or 3), a resilient member comprised of a washer spring 13 (FIG. 1) or a spring washer 19 (FIG. 4). Although it is preferable to use a double nut for the prevention of looseness, a single nut may be employed.

In the following, a locking washer according to a sixth embodiment of this invention will be explained with reference to FIG. 9.

The washer of this embodiment is featured in that, in stead of the double nut 23, 24 in FIG. 6, a push nut 26 for resiliently pressing the inner ring 22 is employed for cost reduction. This washer arrangement is suitable for a case where it is enough to apply a small pressing force to the inner ring 22.

Figure 9:
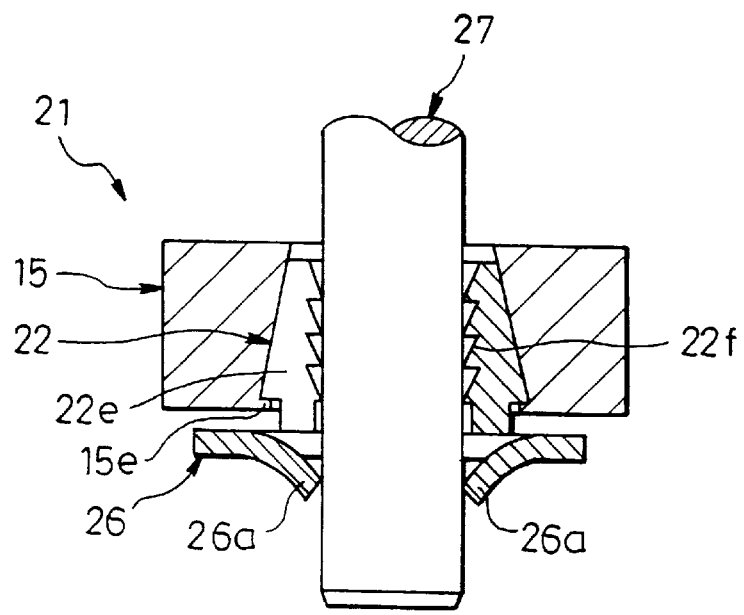
FIG. 9 is a sectional view of a locking washer according to a sixth embodiment of the present invention.

As shown in FIG. 9, the push nut 26 is formed at a central part with an axial bore through which a shaft member 27 extends, and is provided with engagement pawls 26a at spacial intervals in the direction circumferentially of the push nut. These engagement pawls have resilience and extend radially inwardly of the axial bore. The engagement pawls 26a serve to hold the push nut 26 immovable relative to the shaft member 27. For this reason, the nuts 23, 24 shown in FIG. 6 are not required in mounting the washer of this embodiment onto the shaft member 27. This makes it possible to employ the round bar 27 in stead of the bolt 18, whereby costs can be reduced. Further, this arrangement which does not require the provision of nut improves the operability.

Figure 10:
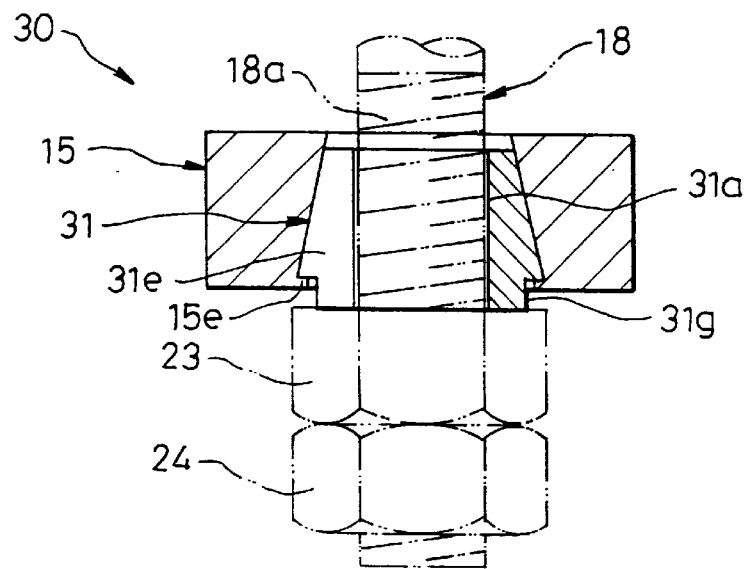
FIG. 10 is a sectional view showing a locking washer according to a seventh embodiment of the present invention.

With reference to FIG. 10, a locking washer according to a seventh embodiment of this invention will be explained.

As shown in FIG. 10, the locking washer 30 of this embodiment is basically the same in construction as the washer 21 shown in FIG. 6. Like numerals are affixed to elements similar to those shown in FIG. 6 and explanations thereon will be omitted. The locking washer 30 is featured in that it has the inner ring 31 whose bolt-hole-formed face is not provided with engagement pawls, whereby costs are reduced.

More specifically, the inner ring 31 is formed with a bolt hole 31a simply comprised of a through hole. That is, the inner ring 31 has the bolt-hole-formed face formed with no engagement pawls. The inner ring 31 and the bolt 18 are so arranged that the thread portion 18a of the bolt 18 faces the bolt-hole-formed face of the inner ring 31, whereby the thread ridges of threads formed in the thread portion 18a serve as engagement pawls which can bite into the bolt-hole-formed face of the inner ring 31.

Although the just-mentioned embodiment is arranged to hold the inner ring 31 with use of the double nut 23, 24 attached to the bolt 18, the push nut shown in FIG. 9 may be used in stead of the double nut.

In the following, with reference to FIG. 11, a locking washer according to an eighth embodiment of this invention will be explained.

Figure 11:
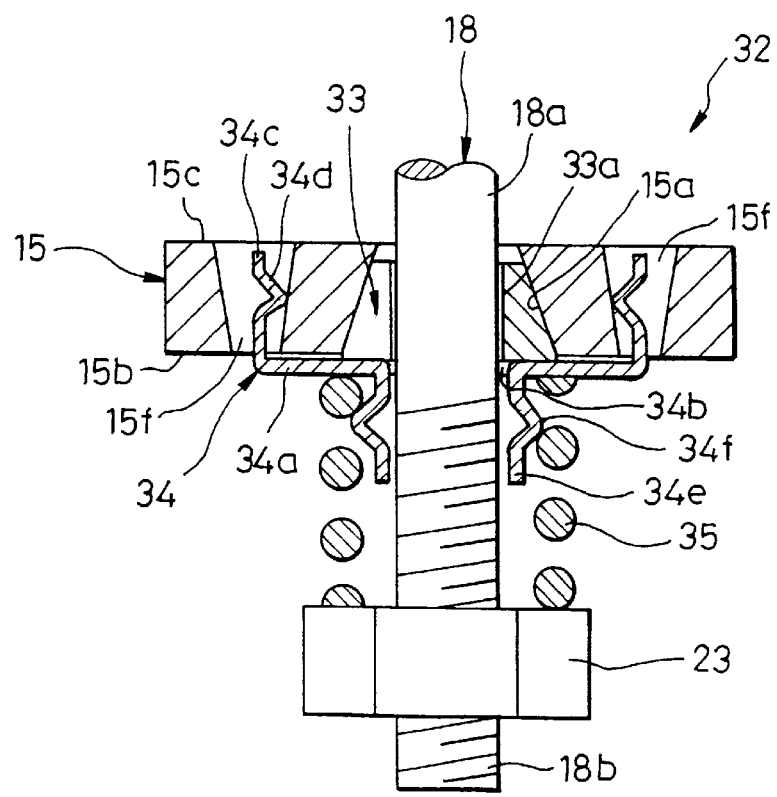
FIG. 11 is a sectional view showing a locking washer according to an eighth embodiment of the present invention.

As shown in FIG. 11, the washer 32 of this embodiment has substantially the same basic arrangement as that of the washer shown in FIG. 10. In FIG. 11, like elements corresponding to those shown in FIG. 10 are denoted by like numerals. The washer 32 is featured in that it is comprised of outer plate 15, inner ring 16, spring seat 34 and coil spring 35 which are unified into one piece so that the resultant washer is easy to handle.

In FIG. 11, the spring seat 34 of the locking washer 32 has an annular main body 34a which is disposed between the lower end face of the inner ring 33 and the coil spring 35. Reference numeral 34b denotes a bolt insertion hole which is formed at a central part of the main body 34a. The spring seat 34 is provided with first and second engagement pieces (first and second extensions) 34c and 34e. Each engagement piece set includes three engagement pieces, for instance.

The first engagement pieces 34c of the spring seat 34 extend vertically from the outer peripheral edges of the main body 34c toward the washer. These engagement pieces are arranged at intervals in the circumferential direction of the main body 34a. Each of the first engagement pieces 34c is bent at its intermediate portion into a V-shape to have their inner faces formed with engagement projections 34d directed radially inwardly of the washer.

The outer plate 15 of the washer 34 is formed with the tapered bore 15a for receiving the inner ring 33 and three accommodation holes 15f which have, e.g., an arcuate shape in transverse section and which accommodate therein the three first engagement pieces 34c of the spring seat 34, respectively. The diameter of the accommodation holes 15f decreases from the lower face 15b to the upper face 15c of the outer plate 15. Each of the first engagement pieces 34c of the spring seat 34 disposed in the accommodation holes 15f is adequately engaged at its engagement projection 34d with the peripheral face of the accommodation hole 15f by means of a spring force of the first engagement piece 34c, so that the spring seat 34 is hardly detached from the outer plate 15.

The second engagement pieces 34e of the spring seat 34 vertically project from the inner peripheral edge of the main body 34a in the direction away from the washer, respectively, and are spaced uniformly in the circumferential direction of the main body 34a. Each of the second engagement pieces 34e is bent into a V-shape at its intermediate portion. Each second engagement piece has its outer face formed with an engagement projection 34f directed radially outwardly of the washer, in a manner similar to the engagement projections 34d of the first engagement pieces 34c. The three engagement projections 34f are formed at different vertical positions of the washer, so as to be appropriately engaged with the coil spring 35.

In assembling the washer 32 constructed in the above manner, the inner ring 33 is first accommodated in the tapered bore 15a of the outer plate 15. Next, the first engagement pieces 34c of the spring seat 34 are inserted into the accommodation holes 15f of the outer plate 15, so that the main body 34a of the spring seat 34 is brought into contact with the lower face of the inner ring 33. As a result, the inner ring 33 is accommodated within the tapered bore 15a of the outer plate 15 in a condition where the lower face of the inner ring slightly projects beyond the lower face 15b of the outer plate 15. At the same time, the first engagement pieces 34c of the spring seat 34 are engaged with the tapered-accommodation-hole-formed face of the outer plate so as not to be detached from the outer plate 15. Next, the coil spring 35 is inserted against a spring force of the second engagement pieces 34c of the spring seat 34 until the inner end of the coil spring 35 is brought into contact with the main body 34a of the spring seat 34. The coil spring 35 is engaged with the engagement projections 34f of the second engagement pieces 34e of the spring seat 34. In this manner, the locking washer 32 is, as a whole, constituted into one piece.

The foregoing embodiment may be modified such that the outer plate 15 has a tapered outer peripheral face whose outer diameter decreases from the lower face 15b to the upper face 15c. At the same time, the main body 34a of the spring seat 34 may be configured to have substantially the same diameter as the average outer diameter of the outer plate 15. In this case, the engagement projections 34d of the first engagement pieces 34c of the spring seat 34 are adapted to be engaged with the outer peripheral face of the outer plate 15.

In the following, a locking apparatus according to a ninth embodiment of the present invention will be explained with reference to FIGS. 12 through 14.

The locking apparatus of the present embodiment includes a locking washer having the same basic construction as that of the washer shown in FIG. 1. In FIGS. 12 through 14, those elements which are the same as or similar to elements shown in FIG. 1 are denoted by reference numerals which are equal to the sum of the reference numerals for those of FIG. 1 plus 100. Explanations as to the construction and function of these elements will be partly omitted.

The locking apparatus 110 of the present embodiment is featured in that it has a locking washer 111 comprised of an outer plate 115, an inner ring 116, and an urging element such as a disc spring 114 which is formed integrally with the elements 115 and 116 and which serves to slightly press the inner ring 116 against the outer plate 115, and is featured in that the outer plate 115 is fixed to a pillar 1 of a wooden building (more generally, a construction element) by use of fixture elements (engagement elements) such as nails 120.

In connection with the first feature of the present embodiment, the outer plate 115 is formed with a shallow hole (recess) 115d which has a large diameter and which accommodates therein the disc spring 114. The shallow hole 115d is arranged coaxially of a tapered bore 115a for receiving the inner ring and opens to a lower end face 115b of the outer plate 115. The disc spring 114 is formed of a resilient material for generating a spring force and is formed into an annular shape. Further, the disc spring 114 is formed at its central part with a hole 114b through which a shaft portion 5a or a threaded portion 5b of a bolt 5 is loosely inserted.

Figure 12:
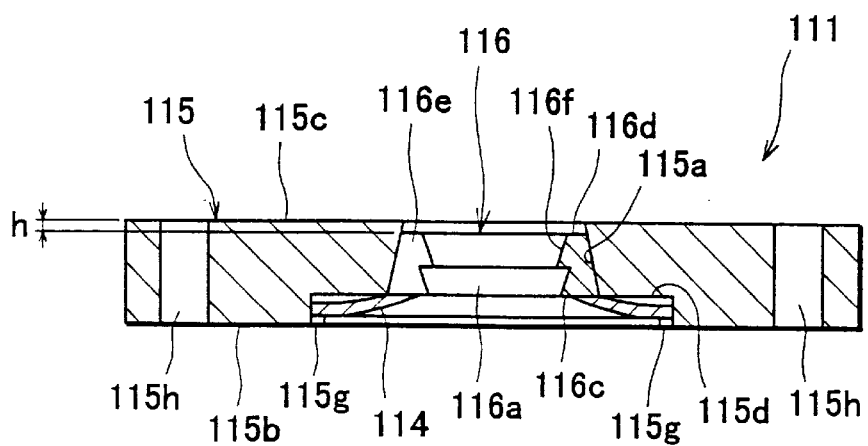
FIG. 12 is a sectional view showing a locking washer according to a ninth embodiment of the present invention.
Figure 13:
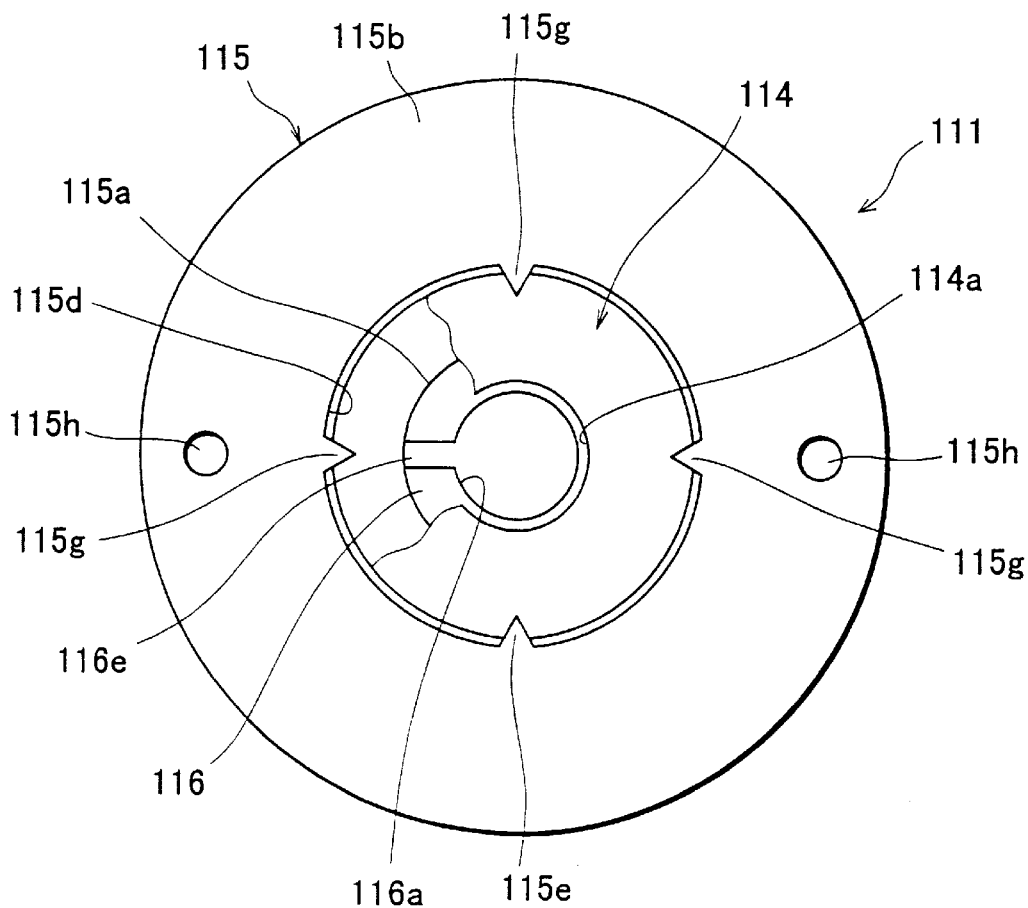
FIG. 13 is a bottom view, partly cut away, of the locking washer shown in FIG. 12.

In FIGS. 12 and 13, reference numeral 115g denote caulking portions which are, e.g., four in number and which serve to prevent the inner ring 116 and the disc spring 114 from being detached from the outer plate 115. These caulking portions 115g are provided at the lower-end-face side of the inner peripheral face (recess-formed face) of the outer plate 115 at intervals along the circumferential direction of the outer plate after the inner ring 116 is received in the tapered bore 115b of the outer plate 115 and the disc spring 114 is accommodated in the recess 115d of the outer plate 115.

When the inner ring 116 and the disc spring 114 are received in the tapered bore 115a and recess 115d of the outer plate 115, respectively, the outer peripheral edge portion of the disc spring 114 is in urged contact with the caulking portions 115g whereas the inner peripheral edge portion 114a of the disc spring is in urged contact with the lower end face 116c of the inner ring 116, respectively. Further, the disc spring 114 produces a spring force for pressing the inner ring 116 against the outer plate 115. The disc spring 114 only required to slightly press the inner ring 116 against the outer plate 115 is not required to produce a strong spring force.

In connection with the second feature of the locking apparatus 110, the outer plate 115 is formed at its outer peripheral edge portion with a plurality of, e.g., two insertion holes 115h for permitting the nails 120 extend therethrough, which are separated from each other circumferentially of the outer plate 115.

In the following, the manner of mounting the locking apparatus 110 shown in FIGS. 12 through 14 to the bolt 5 and the operation of the apparatus 110 will be explained. The apparatus 110 is mounted to the bolt 5 basically in the same manner as in the case of the apparatus shown in FIG. 1 and the operation of the apparatus 110 is basically the same as that of the apparatus of FIG. 1.

First, the locking washer 111 is assembled. More specifically, the inner ring 116 and the disc spring 114 are accommodated in the tapered bore 115b and recess 115d of the outer plate 115 in sequence, and then the caulking portions 115g are provided on the outer plate 115. When the assemblage of the washer 111 is finished in this manner, the inner ring 116 is pressed into the tapered bore 115a of the outer plate 115 by a spring force of the disc spring 114.

Next, the locking washer 111 is mounted to the bolt so that the upper end face 115c of the outer plate 115 is brought into contact with the side face 1b of the pillar 1. Further, the nails 120 respectively aligned with the insertion holes 115h of the outer plate 115 are driven into the pillar 1, thereby fixing the outer plate 115 to the pillar 1. In this state where the washer 111 is fixed to the pillar 1, a slight gap corresponding to the height difference h between the outer plate and the inner ring is present between the upper end face 116d of the inner ring 116 and the side face 1b of the pillar 1.

Next, the nut 107 threadedly engaged with the bolt 5 is fastened. The nut 107 which is larger in diameter than the recess 115d of the outer plate 115 is brought in urged contact with the inner peripheral edge portion of the outer plate 115. Thus, the nut 107 is prevented from pressing the disc spring 114 received in the tapered bore 115a. When tightened on an occasion that the washer 111 is mounted to the bolt 5, the nut 107 pulls the bolt 5 toward the washer 111 and removes an axial play of the bolt 5, thereby positively mounting the washer 111 to the bolt 5. After the washer 111 is mounted to the bolt 5, the nut 107 is not inevitably necessary.

Figure 14:
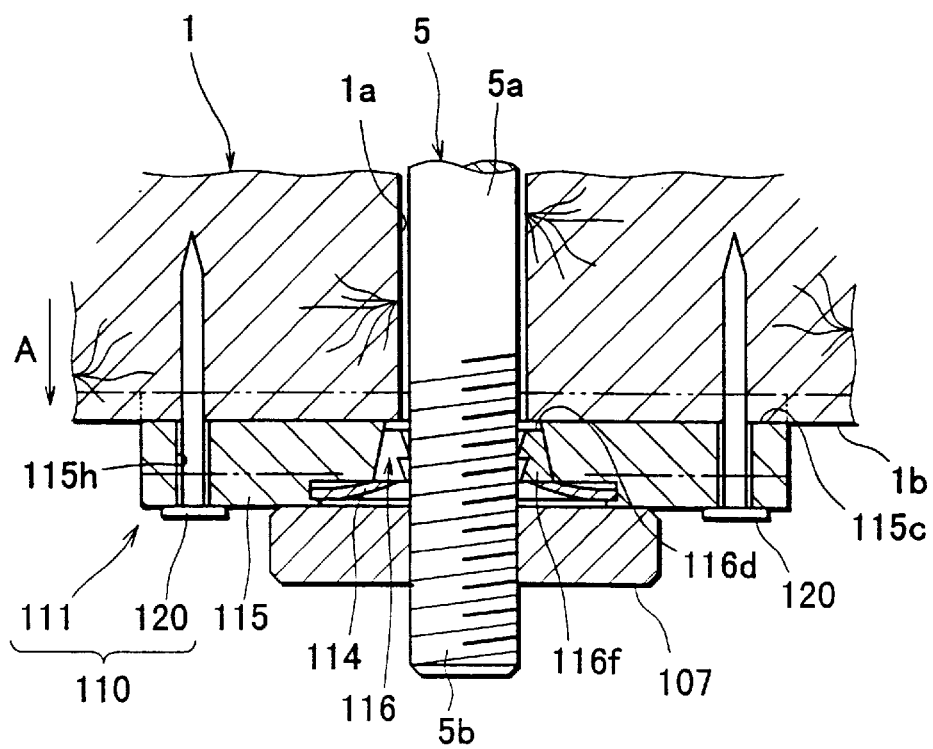
FIG. 14 is a locking apparatus comprised of the locking washer shown in FIGS. 12 and 13.

If the pillar 1 is thinned with elapse of time and the side face 1b of the pillar retreats as shown by the two-dotted chain line in FIG. 14, the washer 111 moves together with the side face 1b of the pillar as illustrated by the two-dotted chain line since the engagement pawls 116f of the inner ring 116 are so directed as to permit the bolt 5 to easily move toward the pillar 1. As a consequence, the washer 111 is kept fastened with the pillar 1 even if the pillar is considerably thinned.

Generally, a construction such as a log cabin comprised of logs which are piled up one another is liable to be thinned since the weight of logs is applied to logs situated thereunder. For this reason, the fastening between the logs by means of through bolts and fixture nuts threadedly engaged therewith is liable to be loosened. Thus, these fixture nuts are required to be frequently fastened, and the fastening work is troublesome. The locking washer 111 is especially useful in preventing the fastening in a wooden building such as a log cabin from being loosened.

When an external vibration input is applied to the pillar 1 and the pillar is moved in the direction of arrow A in FIG. 14, the outer plate 115 is moved by the pillar in the same direction, whereas the inner ring 116 which is separated from the pillar 1 is not moved by the pillar. Immediately after the outer plate 115 moves in the direction of arrow A, the tapered-bore-formed face of the outer plate 115 tightens the tapered outer periphery 115b of the inner ring 116 which is pressed against the outer plate 115 by means of the disc spring 114.

The inner ring 116 which is formed with the slit 116e decreases in diameter when a pressing force is applied from the outer plate 115, so that engagement pawls 116f of the inner ring 116 bite into the surface of the threaded portion 5b of the bolt 5. As a result, the pillar 1 is prevented from further moving in the direction of arrow A, whereby the fastening between the pillar 1 and the beam is maintained.

Although a gap is produced between the lower face 115b of the outer plate 115 and the nut 107 if the washer 111 moves together with the pillar 1 as the pillar is thinned, such a gap does not pose a substantial problem because the looseness prevention effect is achieved by the washer 111.

The locking washer 111 and the locking apparatus 110 shown in FIGS. 12 through 14 may be modified variously.

For instance, a nut 107 whose diameter is smaller than that of the recess 115d of the outer plate 115 may be employed together with a plain washer having a diameter larger than that of the recess 115d and interposed between the nut 107 and the outer plate 115.

Screw spikes or screws or stud bolts other than the nails 120 shown in FIG. 14 may be employed as fixture elements (engagement elements) for fixing the outer plate 115 to the pillar 1.

Depending on the type of a construction to which the locking washer or the locking apparatus is applied, a push nut as shown in FIG. 9 may be employed in stead of the nut 107, thereby achieving a reduction in costs and an improvement in operability. In some cases, the locking washer 111 alone may be employed without using a nut or a push nut. This makes it possible to achieve a further reduction in costs.

The provision of engagement pawls 116f in the inner periphery of the inner ring 116 is not essentially required. By removing the engagement pawls 116f, fabrication costs of the inner ring can be reduced.

Figure 15:
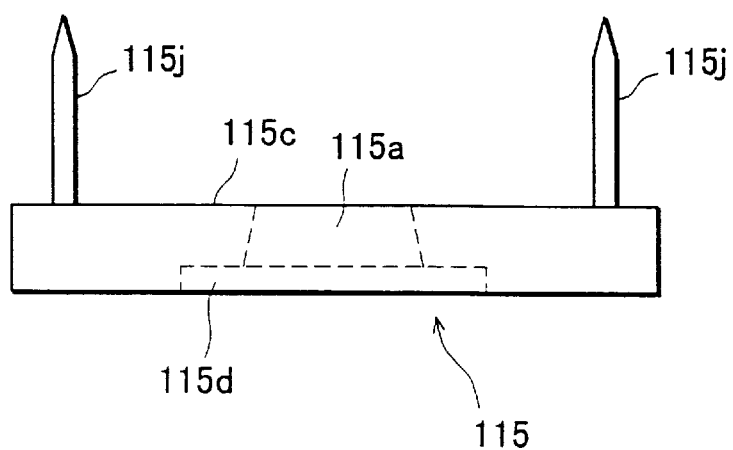
FIG. 15 is a side view of an outer plate in a modification of the locking apparatus of the ninth embodiment of the present invention.

Furthermore, in stead of forming nail insertion holes 115h in the outer plate 115, a plurality of, e.g., two engagement pawls 115j perpendicularly projecting from the upper end face 115d of the outer plate 115 may be formed integrally with the outer plate 115, as shown in FIG. 15, and these engagement pawls 115j may be driven into a wooden construction element to thereby fix the outer plate 115 thereto. In this case, a reduction in number of component parts and a reduction in costs can be achieved, and the operability can be improved.

Figure 16:
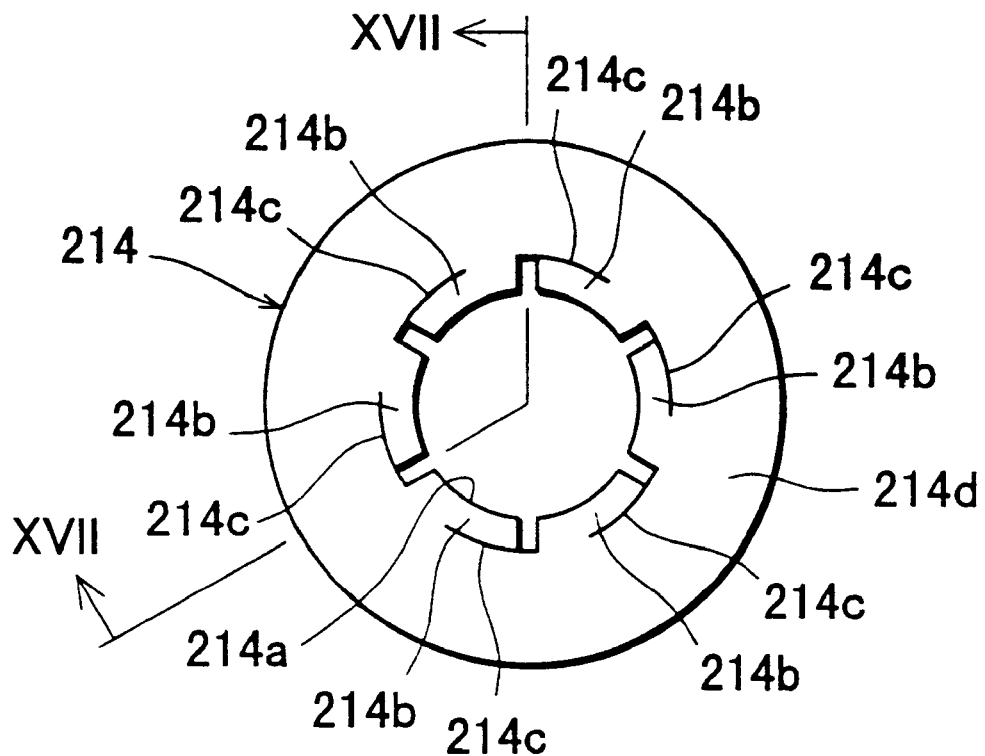
FIG. 16 is a plan view showing a disc spring in a further modification of the locking apparatus according to the ninth embodiment of the present invention.
Figure 17:
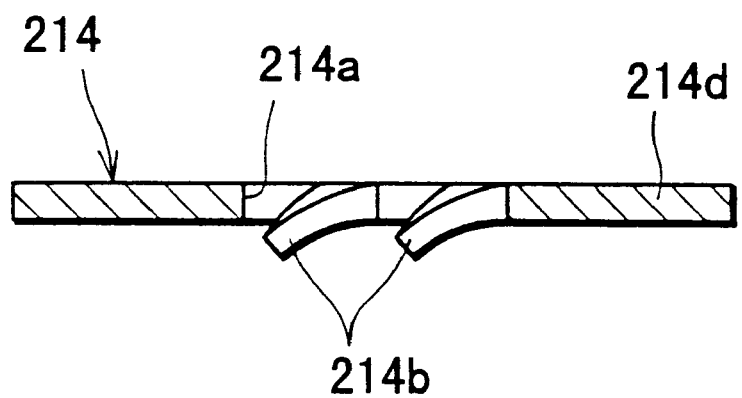
FIG. 17 is a sectional view taken along line XVII—XVII in FIG. 16.

Moreover, in stead of the disc spring 114 shown in FIGS. 12 through 14, an annular disc spring 214 shown in FIGS. 16 and 17 may be employed. The annular disc spring 214 has a plurality of, e.g., six spring portions 214b which are long in length. These spring portions 214b are provided by forming six notches 214c in the inner peripheral edge portion of the disc 214 so as to be circumferentially spaced from one another and by bending the notches toward the inner-ring side. When the annular disc spring 214 is received in the recess 115d of the outer plate 115, respective distal ends of the spring portions 214b are in urged contact with lower end face 116c of the inner ring 116 and the outer peripheral edge portion of the end face 214d of the annular disc spring 214 is in urged contact with caulking portions 115g of the outer plate 115, so that the inner ring 116 is pressed against the tapered-bore-formed face of the outer plate 115.

It is not inevitably required to provide the caulking portions 115g in the outer plate 115 after the disc spring 114 or 214 shown in FIGS. 12 and 13 or FIGS. 16 and 17 is accommodated in the recess 115d of the outer plate 115. For instance, notches for permitting the caulking portions 115g to pass therethrough may be formed in advance at the outer peripheral edge portion of the disc spring 114 or 214. In this case, the disc spring 114 or 214 is inserted in a state where the notches are aligned with the caulking portions 115g, and then the disc spring 114 or 214 is rotated in the recess 115d so as not to be detached therefrom.

Figure 18:
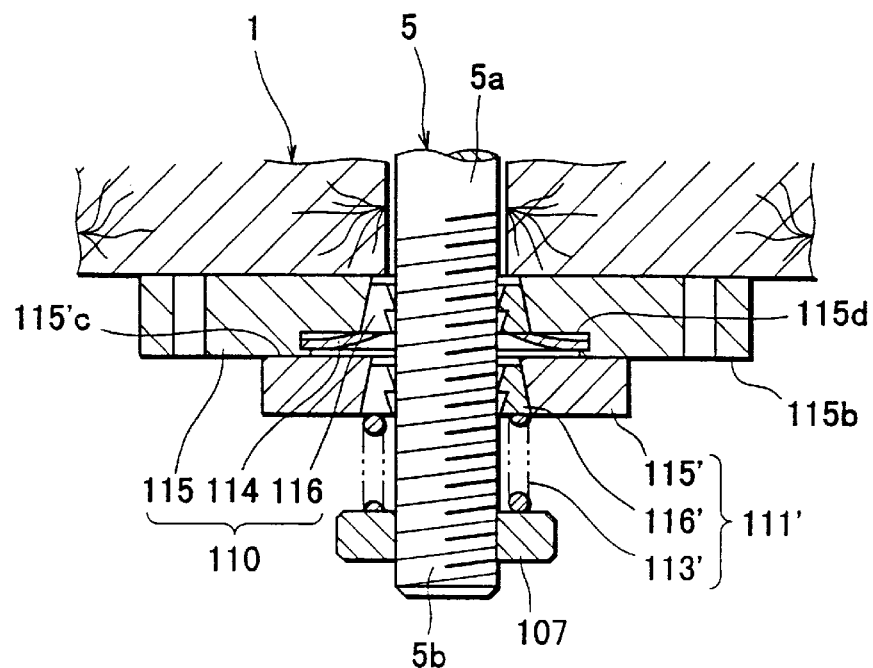
FIG. 18 is a sectional view showing a locking apparatus according to a tenth embodiment of the present invention.

With reference to FIG. 18, a locking apparatus according to a tenth embodiment of the present invention will be explained.

The locking apparatus of FIG. 18 is comprised of a first locking washer 111 which corresponds to the washer shown in FIGS. 12 and 13 and a second locking washer 111' which substantially corresponds to the locking apparatus shown in FIG. 1.

A second outer plate 115' has an outer diameter larger than the diameter of the recess 115d of a first outer plate 115, so that the upper end face 115'c of the second outer plate 115' is in contact with the lower end face 115b of the first outer plate 115. A coil spring 113' is provided, in a compressed state, between the lower end face of a second inner ring 116' and a nut 107. The second inner ring 116' is always pressed toward the second outer plate 115' by a spring force of the coil spring 113'. The first outer plate 115 is always pressed against the pillar 1 by means of a spring force which is applied through the second outer plate 115' to the first outer plate 115. Thus, it is unnecessary to fix the first outer plate 115 to the pillar 1.

The locking apparatus of FIG. 18 operates as in the case of the apparatus shown in FIGS. 12 through 14. Explanations as to the operation of the locking apparatus will be omitted. By using the two washers 111 and 111' which are piled up as shown in FIG. 18, the engagement force applicable to the bolt 5 from the locking apparatus can be considerably increased. In this respect, the apparatus of FIG. 18 is especially useful to prevent the fastening between constructional element of a large construction from being loosened.

Figure 19:
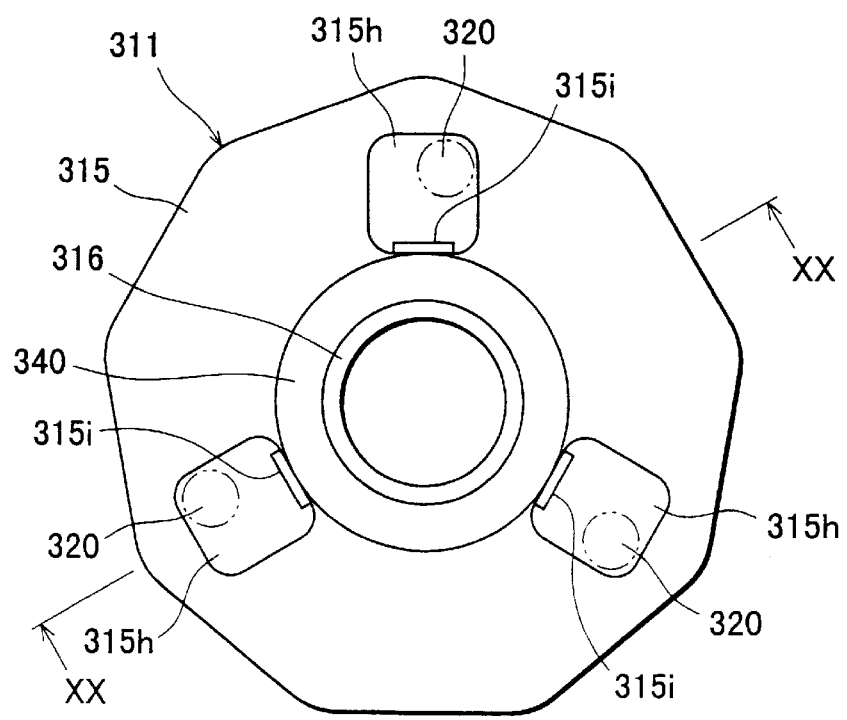
FIG. 19 is a plan view showing a locking washer according to an eleventh embodiment of the present invention.
Figure 20:
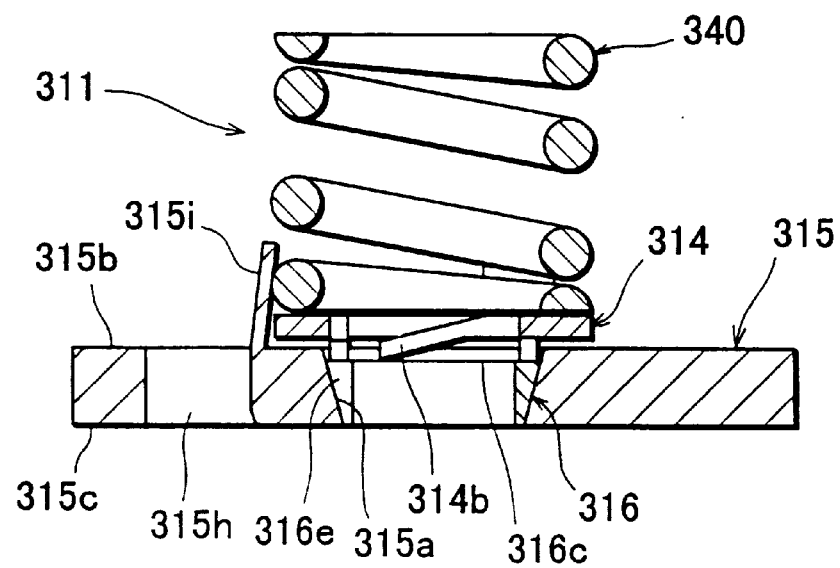
FIG. 20 is a sectional view taken along line XX—XX in FIG. 19.

In the following, a locking washer according to an eleventh embodiment of the present invention will be explained with reference to FIGS. 19 and 20.

The locking washer 311 of the present embodiment is constructed basically the same as the washer shown in FIGS.

12 through 14. In FIGS. 19 and 20, those elements which are the same as or similar to corresponding elements shown in FIGS. 12 to 14 are denoted by like numerals. In brief, an outer plate 315 is formed with a tapered bore 315a in which an inner ring 316 is received. The inner ring 316 has its vertical height slightly less than that of the outer plate 315. A disc spring 314 is disposed on the side close to the end face 315b of the outer plate 315. Respective distal ends of spring portions 314b of the disc spring 314 are in contact with one end face 316c of the inner ring 316, so that the inner ring 316 is pressed against the tapered-bore-formed face of the outer plate 315.

The locking washer 311 is featured in that the pressing force at which the inner ring 316 is pressed against the outer plate 315 increases. In this connection, the washer 311 includes a coil spring 340 for urging the inner ring 316 toward the outer plate 315 through the disc spring 314.

The coil spring 340 is so disposed that one end thereof is in contact with the opposed end of the disc spring 314, and that the coil spring 340 is engagedly held by engagement pawls 315i which are, e.g., three in number and which are provided in the outer plate 315 at regular angular intervals. These engagement pawls 315i are formed by cutting and raising corresponding parts of the outer plate 315 toward the end face 315b. By forming the engagement pawls 315i in this manner, holes 315h which may serve as nail insertion holes are formed at locations adjacent to these pawls.

The locking washer 311 is employed in the same manner as in the case of the washer 111 shown in FIGS. 12 to 14. That is, the outer plate 315 which is so disposed that its end face 315c is in contact with the side face of the pillar is fixed by means of nails 320 which pass through the holes 315. Then, the inner ring 316, the disc spring 314 and the coil spring 340 are attached to the fixture bolt for the pillar, and a nut threadedly engaged with the bolt is fastened while compressing the coil spring 340, whereby the washer 311 is mounted to the pillar.

Figure 21:
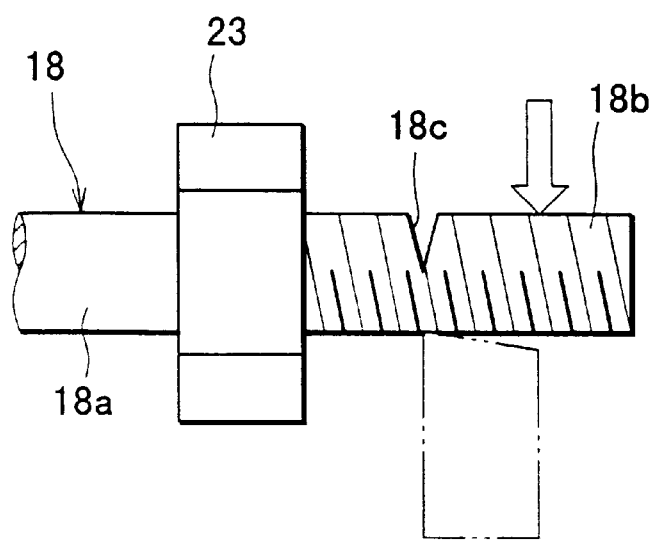
FIG. 21 is a fragmentary side view showing a bolt for use with a locking washer according to the present invention.

With reference to FIG. 21, a preferred example of a bolt serving as a fastening element will be explained.

The bolt 18 is formed with a notch 18c at a location in the vicinity of the proximal end of the thread portion 18b. A locking washer is mounted to the bolt 18, and then a nut 23 is threadedly engaged with the thread portion 18b so as to face a proximal end portion of the thread portion 18b. Thereafter, as shown by the open arrow in FIG. 21, the bolt 18 is cut at its notch 18c by striking a distal end portion of the bolt 18 by a hammer, etc. As a result, the length of the thread portion 18b of the bolt 18 is shortened, whereby the bolt 18 is prevented from interfering with peripheral elements (not shown) such as a partition wall subsequently disposed adjacent to the distal end of the bolt 18. Especially, in case that the locking washer is received within a hole formed by engraving in a construction element with the intention of avoiding interfere between the locking washer and its peripheral elements, it is useful to cut off an undesired distal end portion of the bolt 18 once the washer has been accommodated in the hole of the construction element.

The present invention is not limited to the foregoing embodiments, and may be modified in various manners.

In the embodiments, the outer plate formed with the tapered bore and the inner ring formed into a truncated cone which is complementary to the tapered bore. However, this invention is not limited thereto. The bore of the outer plate and an outer shape of the inner ring may be formed such that a force exerting radially inwardly of the inner ring is applied from the outer plate to the inner ring when the outer plate is displaced along the shaft member in the direction away from the first construction element. For example, the outer plate may be formed with a tapered bore, whereas the inner ring disposed in the tapered bore may be formed into a cylindrical slit ring which has an outer diameter, e.g., nearly equal to an average diameter of the tapered bore. In this case, the outer periphery of only one end portion, to which the outer plate is pressed, of the inner ring may be tapered so that the inner ring can move smoothly along the tapered-bore-formed face of the outer plate. Further, a round bar formed into a doughnut-shape may be employed as the inner ring. Alternatively, the inner ring may be formed into a C slit ring, whereas the outer plate may be formed with a stepped cylindrical bore in which the C ring is disposed and which has a small diameter portion whose diameter is smaller than an average outer diameter of the C ring and a large diameter portion whose diameter is greater than the average outer diameter of the C ring. In this case, only the stepped portion, to which the C ring is pressed, of the stepped bore may be tapered so that the inner ring is smoothly moved along the stepped bore-formed face of the outer plate.

In the foregoing embodiments, the inner ring is comprised of a C-ring which is obtained by forming an axial slit in the peripheral wall of a truncated cone. However, this is not inevitably necessary. For instance, a split inner ring may be used which is comprised of two halves, each of which has an arcuate shape in traverse cross section. The ring halves correspond to ones obtained by axially splitting the C-ring into two pieces.

In the foregoing embodiments, the outer plate 15, inner ring 16, 22, 31, spring seat 12, 12', etc. are made of iron. This is not inevitably necessary. Depending on the kind of construction elements, the outer plate and the like may be made of a material, other than iron, such as hard synthetic material.

Although several cases where the locking apparatus is used together with a strap bolt for fastening a pillar and a beam made of wood have been explained in the preferred embodiments, the present invention is not limited thereto. For instance, a locking apparatus according to this invention is applicable to a foundation bolt for fixing a foundation to a strip footing, or a fastening section of a vehicle.

Moreover, a locking washer of this invention is applicable to various fastening sections subjected to vibrations, such as fastener for fastening a railroad rail and a tie, highway installations, bridge, vehicular load-carrying platform, engine mount, suspension, and the like.

What is claimed is:

1. A locking washer comprising:
   an outer plate having a first end face disposed in contact with a first construction element and a second end face disposed remote from the first construction element, said outer plate being formed with a bore extending therethrough; and
   an inner ring received in the bore of said outer plate, said inner ring having a first end face disposed close to the first construction element and a second end face disposed remote from the first construction element, said inner ring being formed with an axial bore which extends therethrough in a height direction of said inner ring, said axial bore permitting a shaft member to extend therethrough, said shaft member extending from the first construction member toward said washer, the bore of said outer plate and an outer shape of said inner ring being formed such that a force directed radially inwardly of the inner ring is applied from the outer plate to the inner ring when the outer plate is displaced along the shaft member in a direction away from the first construction element, said inner ring being so configured that a diameter of the axial bore decreases up to an outer diameter of said shaft member when the inner ring receives the force acting radially inwardly of said inner ring under a condition that said inner ring is fitted in said bore of said outer plate;

wherein a multi-row engagement pawl is formed on an axial-bore-formed face of said inner ring, said multi-row engagement pawl comprising plural engagement pawls which are ranged in the height direction of said inner ring, each of said engagement pawls extending circumferentially along an entirety of the axial-bore-formed face of said inner ring and having a tip diagonally directed to the second end face of said inner ring as viewed in a vertical cross section of said inner ring.

2. The locking washer according to claim 1, wherein said bore formed in said outer plate comprises a tapered bore having a diameter which decreases from the second end face toward the first end face of said outer plate, and said inner ring has a tapered outer shape which is complementary to the tapered bore of said outer plate.

3. The locking washer according to claim 1, wherein said washer is operable together with a fastener, and said shaft member extending through said axial bore of said inner ring comprises a shaft portion of a first fastening element of said fastener.

4. The locking washer according to claim 3, wherein:

the first fastening element of the fastener is coupled to a second construction element, and the shaft portion of the first fastening element extends through the first construction element; and the fastener includes a second fastening element which is coupled to the first fastening element on a side remote from the first construction element with respect to said washer in a height direction of said washer, and the second fastening element cooperates with the first fastening element to fasten the first construction element to the second construction element.

5. The locking washer according to claim 1, wherein said inner ring comprises a slit which extends therethrough in the height direction of said inner ring.

6. A locking washer comprising:

an outer plate having a first end disposed in contact with a first construction element and a second end face disposed remote from the first construction element, said outer plate being formed with a bore extending therethrough; and an inner ring received in the bore of said outer plate, said inner ring having a first end face disposed close to the first construction element and a second end face disposed remote from the first construction element, said inner ring being formed with an axial bore which extends therethrough in a height direction of said inner ring, said axial bore permitting a shaft member to extend therethrough, said shaft member extending from the first construction member toward said washer, the bore of said outer plate and an outer shape of said inner ring being formed such that a force directed radially inwardly of the inner ring is applied from the outer plate to the inner ring when the outer plate is displaced along the shaft member in a direction away from the first construction element, said inner ring being so configured that a diameter of the axial bore decreases up to an outer diameter of said shaft member when the inner ring receives the force acting radially inwardly of said inner ring under a condition that said inner ring is fitted in said bore of said outer plate;

wherein an engagement portion is formed at a vertical side of said outer plate close to the second end face of said outer elate, said engagement portion projecting from a bore-formed face of said outer plate radially inwardly of said bores and said engagement portion being disposed for contact with the second end face of said inner ring disposed in said bore.

7. The locking washer according to claim 6, wherein:

an annular flange is formed at a side of said inner ring close to the second end face of the inner ring, said annular flange being located at a position radially inwardly of said washer with respect to said engagement portion of said outer plate; and said flange extends in a direction away from the first end face of said inner ring beyond the second end face of said outer plate as viewed in a height direction of said washer, and the second end face of said inner ring comprises an end face of said flange located at a side remote from said outer plate.

8. A locking washer comprising:

an outer plate having a first end disposed in contact with a first construction element and a second end face disposed remote from the first construction element, said outer plate being formed with a bore extending therethrough;

an inner ring received in the bore of said outer plate, said inner ring having a first end face disposed close to the first construction element and a second end face disposed remote from the first construction element, said inner ring being formed with an axial bore which extends therethrouqh in a height direction of said inner ring, said axial bore permitting a shaft member to extend therethrough, said shaft member extending from the first construction member toward said washer, the bore of said outer plate and an outer shape of said inner ring being formed such that a force directed radially inwardly of the inner ring is applied from the outer plate to the inner ring when the outer plate is displaced along the shaft member in a direction away from the first construction element, said inner ring being so configured that a diameter of the axial bore decreases up to an outer diameter of said shaft member when the inner ring receives the force acting radially inwardly of said inner ring under a condition that said inner ring is fitted in said bore of said outer plate; and an urging member made of a resilient material for urging the inner ring toward the outer plate, said urging member being accommodated in a recess formed in the outer plate, said recess opening to the second end face of said outer plate and communicating with the bore of said outer plate, and said urging member being in urged contact with the second end face of said inner ring when said urging member is disposed in the recess of said outer plate.

9. The locking washer according to claim 8, wherein said urging member is disposed in the recess of said outer plate in a manner so that said urging member may not be detached therefrom.

10. The locking washer according to claim 8, further comprising a spring member for pressing the urging member accommodated in the recess of said outer plate toward the first end face of said outer plate; and wherein said spring member is held by engagement pawls formed integrally with said outer plate and projecting from the second end face of said outer plate in a direction away from the first end face of said outer plate.

11. A locking washer comprising:

an outer plate having a first end disposed in contact with a first construction element and a second end face disposed remote from the first construction element, said outer plate being formed with a bore extending therethrough; and an inner ring received in the bore of said outer plate, said inner ring having a first end face disposed close to the first construction element and a second end face disposed remote from the first construction element, said inner ring being formed with an axial bore which extends therethrough in a height direction of said inner ring, said axial bore permitting a shaft member to extend therethrough, said shaft member extending from the first construction member toward said washer, the bore of said outer plate and an outer shape of said inner ring being formed such that a force directed radially inwardly of the inner ring is applied from the outer plate to the inner ring when the outer plate is displaced along the shaft member in a direction away from the first construction element, said inner ring being so configured that a diameter of the axial bore decreases up to an outer diameter of said shaft member when the inner ring receives the force acting radially inwardly of said inner ring under a condition that said inner ring is fitted in said bore of said outer plate;

wherein said outer plate is formed with an engagement element which perpendicularly projects from the first end face of said outer plate in a direction away from the second end face of said outer plate and which is adapted to be engaged with the first construction element; and wherein said outer plate is fixed to the first construction element when the engagement element is engaged with the first construction element.

12. A locking washer comprising:

an outer plate having a first end disposed in contact with a first construction element and a second end face disposed remote from the first construction element, said outer plate being formed with a bore extending therethrough; and an inner ring received in the bore of said outer plate, said inner ring having a first end face disposed close to the first construction element and a second end face disposed remote from the first construction element, said inner ring being formed with an axial bore which extends therethrough in a height direction of said inner ring, said axial bore permitting a shaft member to extend therethrough, said shaft member extending from the first construction member toward said washer, the bore of said outer plate and an outer shape of said inner ring being formed such that a force directed radially inwardly of the inner ring is applied from the outer plate to the inner ring when the outer plate is displaced along the shaft member in a direction away from the first construction element, said inner ring being so configured that a diameter of the axial bore decreases up to an outer diameter of said shaft member when the inner ring receives the force acting radially inwardly of said inner ring under a condition that said inner ring is fitted in said bore of said outer plate;

wherein an insertion hole is formed at a portion of said outer plate located radially outwardly of the bore, said insertion hole extending through said outer plate in a height direction of said outer plate, and said insertion hole permitting an engagement element, which is adapted to be engaged with the first construction element, to pass therethrough; and wherein said outer plate is fixed to the first construction element when the engagement element is engaged with the first construction element.

13. A locking apparatus, comprising:

an outer plate having a first end face disposed in contact with a first construction element and a second end face disposed remote from the first construction element, said outer plate being formed with a bore extending therethrough;

an inner ring cooperating with said outer plate to form a locking washer, said inner ring being received in the bore of said outer plate, said inner ring having a first end face disposed close to the first construction element and a second end face disposed remote from the first construction element, said inner ring being formed with an axial bore which extends therethrough in a height direction of said inner ring, said axial bore permitting a shaft member to extend therethrough, said shaft member extending from the first construction member toward said washer, the bore of said outer plate and an outer shape of said inner ring being formed such that a force directed radially inwardly of the inner ring is applied from the outer plate to the inner ring when the outer plate is displaced along the shaft member in a direction away from the first construction element, said inner ring being so configured that a diameter of the axial bore decreases up to an outer diameter of said shaft member when the inner ring receives the force acting radially inwardly of said inner ring under a condition that said inner ring is fitted in said bore of said outer plate; and pressing means for causing said inner ring to be in urged contact with said outer plate, said pressing means including a fastening element which is coupled, on a side remote from the first construction element as viewed in a height direction of said locking apparatus, to said shaft member, and a resilient member which is disposed between the fastening element and said inner ring and which always urges said inner ring toward said outer plate.

14. The locking apparatus according to claim 13, wherein:

said locking apparatus is operable together with a fastener, and said shaft member comprises a shaft portion of a first fastening element of said fastener; and said fastening element of said pressing means is coupled to the shaft portion of the first fastening element of said fastener.

15. The locking apparatus according to claim 13, wherein:

said resilient member comprises a coil spring which always urges said inner ring toward said outer plate, and said pressing means also includes a spring seat having a main body disposed between the second end face of said inner ring and said coil spring; and said spring seat includes a first extension which extends from said main body toward said outer plate and which is engaged with said outer plate, and a second extension which extends from said main body toward the fastening element of said pressing means and which holds said coil spring.

16. The locking apparatus according to claim 13, further comprising an engagement element adapted to be engaged with the first construction element; and wherein said outer plate is fixed to the first construction element when said engagement element is engaged with the first construction element.

17. The locking apparatus according to claim 16, wherein said engagement element is formed independently of said outer plates and an insertion hole is formed at a portion of said outer plate located radially outwardly of the bore, said insertion hole extending through said outer plate in a height direction of said outer plates and said insertion hole permitting the engagement element, which is adapted to be engaged with the first construction element, to pass therethrough.

18. The locking apparatus according to claim 16, wherein said engagement element is formed integrally with said outer plate, and said engagement element perpendicularly projects from the first end face of said outer plate in a direction away from the second end face of said outer plate.

* * * * *